(12) United States Patent
Gong et al.

(10) Patent No.: US 10,378,876 B2
(45) Date of Patent: Aug. 13, 2019

(54) PIEZORESISTIVE STRAIN SENSORS COMPRISING ELECTRICALLY CONDUCTING NETWORKS IN POLYMERIC PHASE CHANGE MATERIALS

(71) Applicant: Wisconsin Alumni Research Foundation, Madison, WI (US)

(72) Inventors: Shaoqin Gong, Middleton, WI (US); Zhenqiang Ma, Middleton, WI (US); Yunming Wang, Madison, WI (US); Hongyi Mi, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 459 days.

(21) Appl. No.: 15/171,990

(22) Filed: Jun. 2, 2016

(65) Prior Publication Data

US 2017/0205221 A1    Jul. 20, 2017

Related U.S. Application Data

(60) Provisional application No. 62/182,078, filed on Jun. 19, 2015.

(51) Int. Cl.

| | |
|---|---|
| *G01B 7/16* | (2006.01) |
| *C08K 3/04* | (2006.01) |
| *G01B 1/00* | (2006.01) |
| *C08G 18/48* | (2006.01) |
| *C08G 18/76* | (2006.01) |
| *C08K 3/08* | (2006.01) |

(52) U.S. Cl.
CPC ........... *G01B 7/18* (2013.01); *C08G 18/4854* (2013.01); *C08G 18/7664* (2013.01); *C08K 3/041* (2017.05); *C08K 3/042* (2017.05); *C08K 3/08* (2013.01); *G01B 1/00* (2013.01); *C08K 2201/001* (2013.01); *C08K 2201/011* (2013.01)

(58) Field of Classification Search
CPC .. G01B 7/18; C08K 3/04; C08K 3/041; H01L 41/1132
See application file for complete search history.

(56) References Cited

U.S. PATENT DOCUMENTS

| | | | | |
|---|---|---|---|---|
| 4,097,426 | A | * 6/1978 | Koike | ..................... C08G 18/10 |
| | | | | 252/182.15 |
| 2010/0300618 | A1* | 12/2010 | Frackmann | ............ C08G 18/44 |
| | | | | 156/280 |
| 2012/0312102 | A1* | 12/2012 | Alvarez | .............. E21B 33/1208 |
| | | | | 73/862.041 |

OTHER PUBLICATIONS

Yu et al., Stretchable Supercapacitors Based on Buckled Single-Walled Carbon Nanotube Macrofilms, Adv. Mater. 2009, 21, Aug. 12, 2009, pp. 4793-4797.
Stassi et al., Flexible Tactile Sensing Based on Piezoresistive Composites: A Review, Sensors 2014, 14, Mar. 14, 2014, pp. 5296-5332.
Amjadi et al., Highly Stretchable and Sensitive Strain Sensor Based on Silver Nanowire-Elastomer Nanocomposite, ACS Nano, 2014, 8 (5), Apr. 21, 2014, pp. 5154-5163.

(Continued)

*Primary Examiner* — Erika J Villaluna
(74) *Attorney, Agent, or Firm* — Bell & Manninng, LLC; Michelle Manning

(57) ABSTRACT

Piezoresistive composite materials comprising electrically conductive particles in a polymeric phase change material are provided. Also provided are strain sensors incorporating the composites and methods for detecting mechanical strain using the composites.

23 Claims, 19 Drawing Sheets

(56) References Cited

OTHER PUBLICATIONS

Li et al., Scalable Fabrication of Multifunctional Freestanding Carbon Nanotube/Polymer Composite Thin Films for Energy Conversion , ACS Nano, vol. 6, No. 2, Jan. 11, 2012, pp. 1347-1356.

Wang et al., Highly stretchable and sensitive piezoresistive carbon nanotube/elastomeric triisocyanate-crosslinked polytetrahydrofuran nanocomposites , J. Mater. Chem. C, 2016, 4, Dec. 3, 2015, pp. 460-467.

Sekitani et al., A Rubberlike Stretchable Active Matrix Using Elastic Conductors, Science, vol. 321, Aug. 7, 2008, pp. 1468-1472.

Chun et al., Highly conductive, printable and stretchable composite films of carbon nanotubes and silver, Nature Nanotechnology | vol. 5, Nov. 28, 2010, pp. 853-857.

Lee et al., Highly Stretchable and Highly Conductive Metal Electrode by Very Long Metal Nanowire Percolation Network, Adv. Mater. 2012, 24, May 21, 2012, pp. 3326-3332.

Kim et al., Stretchable nanoparticle conductors with self-organized conductive pathways, Nature, vol. 500, Jul. 17, 2013, pp. 59-63.

\* cited by examiner

PIEZORESISTIVE STRAIN SENSORS COMPRISING ELECTRICALLY CONDUCTING NETWORKS IN POLYMERIC PHASE CHANGE MATERIALS

CROSS-REFERENCE TO RELATED APPLICATIONS

The present application claims priority from U.S. provisional patent application No. 62/182,078, filed Jun. 19, 2015, the entire contents of which are incorporated herein by reference.

REFERENCE TO GOVERNMENT RIGHTS

This invention was made with government support under FA9550-09-1-0482 awarded by the USAF/AFOSR. The government has certain rights in the invention.

BACKGROUND

Nanocomposites with stretchable or elastic conductivity regulation can be used to make sensory skins, wearable health monitors, electronic textiles, and biomedical detectors with high durability for body movements and deformations. These applications require nanocomposites with high responsivity to stimuli. Significant efforts have been dedicated to this research area, nevertheless, a number of challenges, including complicated synthesis processes, reduction of flexibility, and complex structures have limited their wide-spread applications. Significantly, the performance of stretch-dependent electrical resistance regulation strongly relies on the formulations, structures and properties of the materials used. Carbon nanomaterials, particularly carbon nanotubes and carbon nanofibers, have attracted a great deal of interest as conducting nanofillers for diverse nanocomposites because of their unique electrical and mechanical properties.

SUMMARY

Composite materials comprising electrically conductive particles in a phase change material (PCM) are provided. Also provided are piezoresistive strain sensors incorporating the composites and methods for detecting mechanical strain using the composites.

One embodiment of a strain sensor comprises: a composite comprising crosslinked polyether polyol and electrically conductive particles dispersed in the crosslinked polyether polyol; and a probe configured to measure a strain-induced change in the electrical conductance of the composite.

One embodiment of a method of sensing a strain comprises the steps of: exposing a composite to a strain, the composite comprising crosslinked polyether polyol and electrically conductive particles dispersed in the crosslinked polyether polyol; and measuring a strain-induced decrease in the electrical conductance of the composite.

One embodiment of a composite that can be used in the strain sensors comprises: polytetrahydrofuran crosslinked with triphenymethane triisocyanate, having the structure:

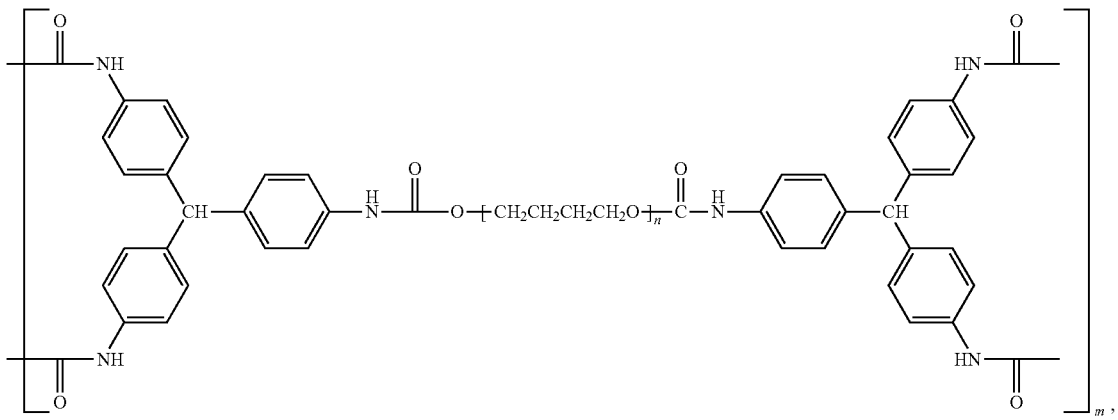

where n and m represent the number of repeat units in the polytetrahydrofuran chain and the crosslinked polytetrahydrofuran, respectively; and electrically conductive particles dispersed in the crosslinked polytetrahydrofuran.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Composites for use as sensing materials with high strain sensitivities and high linear detection ranges are provided. The composites are composed of electrically conductive particles, such as multi-walled CNTs, and an elastomeric polymeric PCM. The electrically conductive particles are dispersed in the PCM and provide electrically conducting pathways through the composites, wherein said pathways are altered during the application of an external strain, such as a stretch. As a result of the applied strain, microscopic crystalline regions may be formed in the PCM, such that the PCM undergoes an amorphous-to-crystalline phase transition, and the particles, which are initially randomly distributed in the PCM, preferentially align along the direction of the applied strain. Both phenomena may affect the internal conducting pathways, so that the connectivity and/or the charge carrier tunneling efficiency among the particles is reduced, leading to an overall conductivity decrease of the composite. These characteristics provide the composites with a highly sensitive response to mechanical strain.

The PCMs are elastomeric materials comprising crosslinked polyether polyols that undergo a reversible deformation upon the application of a mechanical force that creates a tensile strain in the materials. The deformation causes the electrically conductive particles in the composites to reconfigure in such a way that the electrical connectivity and/or the charge carrier tunneling efficiency through the composite is reduced and, therefore, the electrical conductance of the composite is also reduced. Without intending to be bound to any particular theory of the invention, the inventors believe that, in at least some embodiments of the composites, the strain applied to the composite results in the formation of microcrystalline domains in the polyether polyol and that these domains can contribute to the physical separation between the electrically conductive particles when the composite is in a strained state.

The polyether polyol polymers are characterized by the structure —[R—O]$_n$— along their backbone, where R represents an alkyl group. Polytetrahydrofuran (PTHF) and polyethylene glycol (PEG) are examples of polyether polyols that can be used in the composites. PTHF polymers are characterized by the structure —[CH$_2$—CH$_2$—CH$_2$—CH$_2$—O]$_n$— along their backbone, while PEG polymers are characterized by the structure —[CH$_2$—CH$_2$—O]$_n$— along their backbone. A variety of polyether polyol polymers and mixtures of polyether polyol polymers can be used. By way of illustration only, suitable PEG polymers include those having a molecular weight (Mn) in the range from about 0.6 to about 40 kDa. Suitable PTHF polymers include those having a molecular weight (Mn) in the range from about 0.5 to about 10 kDa.

Figure 1:
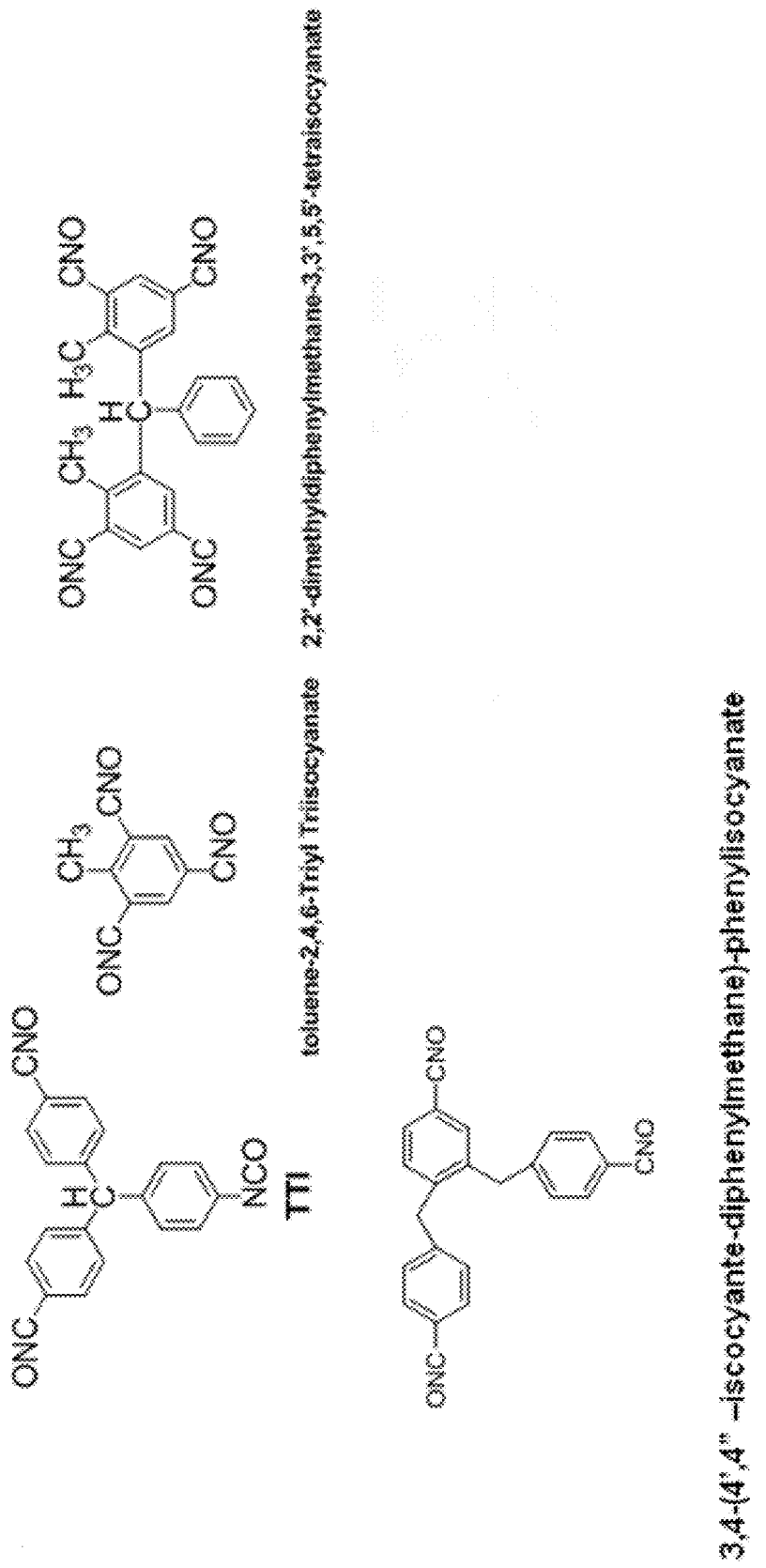
FIG. 1. Multifunctional isocyanate crosslinking agents.
Figure 2:
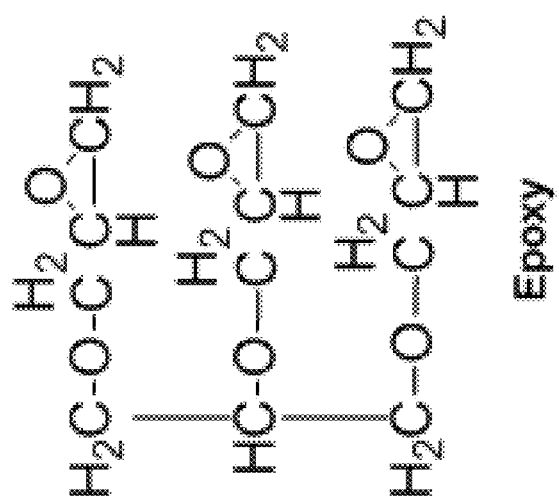
FIG. 2. A multifunctional epoxy crosslinking agent.

The crosslinking agents used to form the crosslinks between the polyether polyol molecules in the PCM have at least two crosslinking groups and desirably have at least three crosslinking groups, so that the crosslinked polyether polyol is a highly branched structure. In some embodiments, the crosslinking agents are multifunctional isocyanates. These include aryl, aliphatic, cycloaliphatic, arylaliphatic, aromatic and heterocyclic polyisocyanates. Specific examples of these include phenyl group-containing and toluene group-containing crosslinking agents, such as triphenymethane triisocyanate (TTI), toluene-2,4,6-triyl triisocyanate, 3,4-(4',4"-isocyanate-diphenylmethane)-phenylisocyanate, 2,2'-dimethyldiphenylmethane-3,3',5,5'-tetraisocyanate. The structures of these crosslinking agents are shown in FIG. 1. However, other crosslinking agents may comprise crosslinking groups other than, or in addition to, isocyanate groups. For example, the crosslinking agents may be epoxy-functional molecules, as example of which is shown in FIG. 2.

Figure 3:
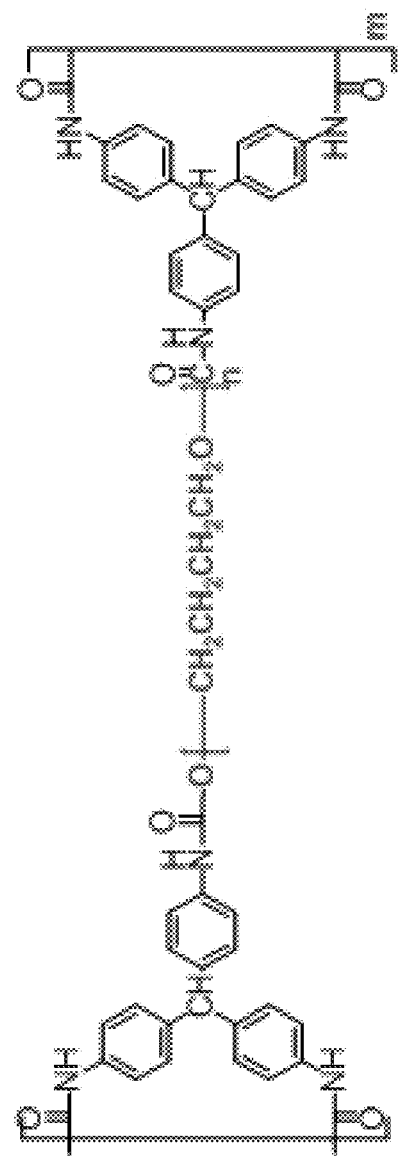
FIG. 3. Polytetrahydrofuran (PTHF) crosslinked with triphenylmethane triisocyanate.

When isocyanate groups are used to crosslink the polyether polyol, the resulting linkages will comprise urethane groups. If the crosslinking agents are aryl isocyanates, the urethane groups may be part of an aryl group in the linkages. When epoxides are used as crosslinking agents, the polyether polyol molecules will be linked via ether linkages. One example of a PCM comprising PTHF crosslinked by an isocyanate crosslinking agent (TTI) is shown in FIG. 3.

The degree of crosslinking in the PCMs should be sufficient to provide the composites with a degree of elasticity appropriate for their intended application, but not so high as to render the PCM insoluble in the solutions used to form the composite materials. Thus, the optimal degree of crosslinking will depend on the polyether polyols, crosslinking agents and solvents being used. By way of illustration only, in some embodiments of the crosslinked PTHFs, the mole ratio of the reactive groups in the crosslinking agent to the hydroxyl groups in the PTHF is in the range from about 0.5 to about 3.0.

The electrically conductive particles dispersed within the PCM matrix of the composites serve to provide a continuous path or network for conducting electricity through the composite when the composite is in its unstrained state. The electrically conductive particles can be made from a variety of materials and can take on a variety of shapes, but desirably are elongated particles with high aspect ratios so that they can provide an entangled conductive network in the nanocomposites. For example, in some embodiments the electrically conductive particles are carbon-based materials, such as carbon nanotubes (CNTs) (single-walled and/or multiwalled), carbon nanofibers or graphene particles. CNTs, carbon nanofibers and graphene, a crystalline form of carbon that is one-atom thick, are well suited for use in the composites due to their superior electrical conductivities. However, metals and electrically conductive metal-containing compounds can also be used. Examples of these include gold and palladium nanowires.

Figure 4:
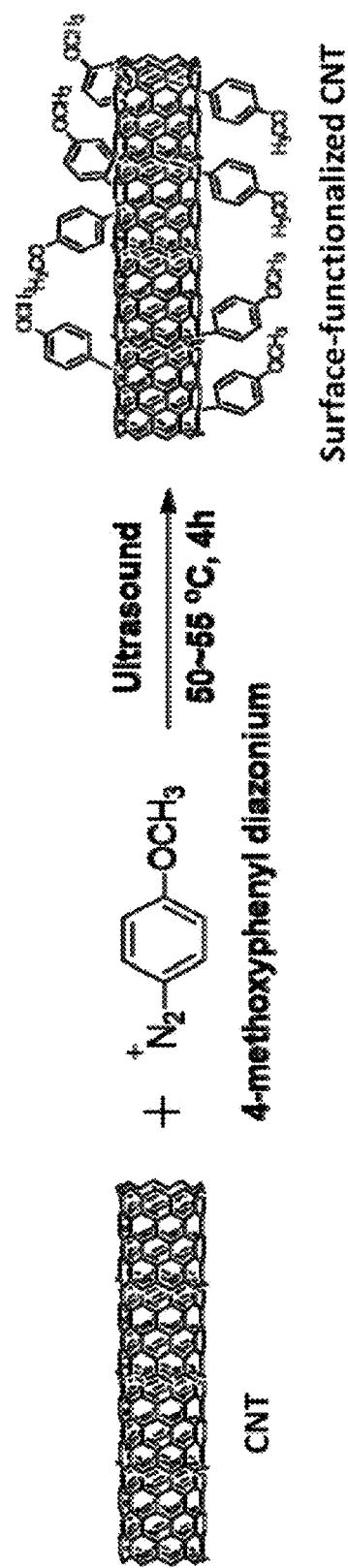
FIG. 4. Reaction scheme showing the surface functionalization of multiwalled carbon nanotubes (CNTs) with p-methoxyphenyl groups.

In some embodiments of the composites, the electrically conductive particles are surface-functionalized in order to provide a more uniform dispersion of the particles in the polyether polyol matrix. Functional groups that may enhance the dispersibility of the particles in the polyether polyol include p-methoxyphenyl groups, polyethylene oxide, and nitrophenyl groups, such as 2,4-dinitrophenyl groups and 2-cyano-4-nitrophenyl groups. For example, if multiwalled carbon nanotubes are used, they may be surface-functionalized with p-methoxyphenyl diazonium salts, as shown in FIG. 4.

Figure 5:
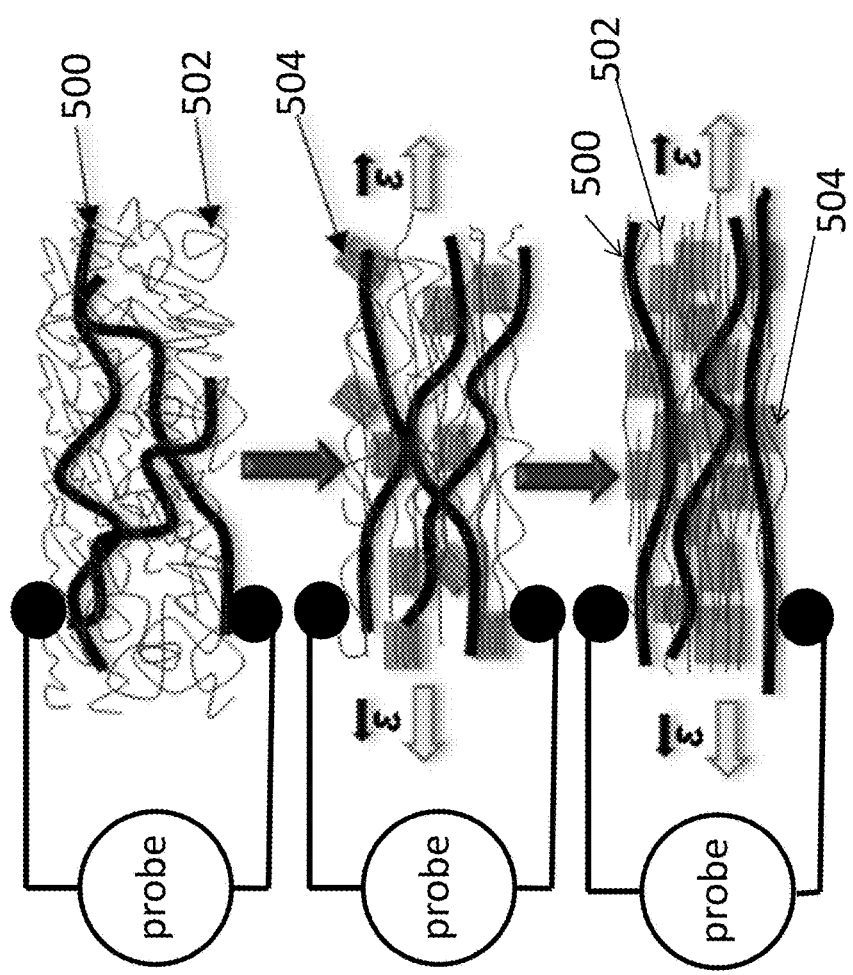
FIG. 5. Conceptual illustration of the microstructure change of the CNT/elastomeric triisocyanate-crosslinked polytetrahydrofuran (ETC-PTHF) nanocomposites in response to the stretching process.

FIG. 5 is a schematic diagram showing the structural changes in a composite as it is subjected to a mechanical stretch that applies a tensile strain to the composite. In the composite of FIG. 5, the electrically conductive particles are CNTs 500 that are initially uniformly dispersed in a crosslinked polyether polyol (e.g., triisocyanate crosslinked polytetrahydrofuran) matrix 502. In the un-stretched state, CNTs 500 form an electrically conductive path through the crosslinked polyether polyol matrix (top panel). However, as the composite is stretched (c), the connectivity and/or electron tunneling between the CNTs are reduced as the CNTs begin to align along the stretching direction and, in some embodiments, crystalline polyether polyol microdomains 504 begin to form in the polymer matrix (middle panel). As the stretching increases, the number and/or size of the crystalline microdomains increases and the CNTs become more aligned along the stretching direction (bottom panel). As a result, the connectivity and/or tunneling efficiency between CNTs 500 in the PCM decreases and some or all of the paths through which electricity could flow are disrupted. The result is a marked decrease in the electrical conductance ($G/G_0$), and a corresponding increase in the electrical resistance ($R/R_0$), of the composite. The microdomain formation and, therefore, the change in the conductance/resistance of the composite is reversible. That is, the crosslinked polyether polyol reverts to its initial un-stretched state when the stretching force is discontinued.

The effective crystallite size, as measured by X-ray diffraction, was in the range from 1 nm to 10 nm, including the range from 2 nm to 5 nm. However, the effective crystallite sizes outside of these ranges are also possible. The average crystallite size and the degree of crystallization of the composite will generally increase with increasing strain.

The concentration of electrically conductive particles in the composite needed to achieve the maximum strain-induced electrical conductance/resistance change varies based on the type of PCM matrix and the type of conductive particles, as well as their functionalization. Generally, the concentration should be at or above the electrical percolation threshold when the PCM is in its initial unstrained state. Composites having a significant electrical conductivity even in their strained state can be used. However, the strain-induced decrease in conductivity for such composites may not be as large.

The concentration of the electrically conductive particles should be sufficiently high that electrically conductive paths are present in its unstrained state, but sufficiently low that the composite retains a degree of elasticity (stretchability) appropriate for its intended sensing applications. The elastic nature of the composites can be assessed by their Young's modulus, as illustrated in the Example, below. Some embodiments of the composites have a Young's modulus in the range from 0.5 to 6 MPa, depending upon the concentration and type of electrically conductive particles used. This includes composites having a Young's modules in the range from 2 to 6 MPa. By way of illustration only, in some embodiments of the composites the concentration of electrically conductive particles is in the range from about 2 to about 25 weight percent (wt. %). This includes embodiments in which the concentration of electrically conductive particles is in the range from about 5 to about 25 wt. % and further includes embodiments in which the concentration of electrically conductive particles is in the range from about 5 to about 20 wt. %.

As noted above, the change in the electrical conductivity of the composites as the result of the applied strain will depend in part on the conductivity of the composites in the strained state. However, the conductivity change can be quite dramatic if the strained electrical conductivity is low (and, therefore, the strained electrical resistivity is high). In some embodiments of the composites the electrical conductivity decreases by a factor of at least 10 as a result of the applied strain. This includes embodiments in which the electrical conductivity decreases by a factor of at least 1000 under an applied strain, such as a tensile strain, of 500%, further includes embodiments in which the electrical conductivity decreases by a factor of at least 1200 under an applied strain, such as a tensile strain, of 500%, and still further includes embodiments in which the electrical conductivity decreases by a factor of at least 1000 under an applied strain of 400%. The electrical conductivity can be determined based on the methods described in the Example. Unless otherwise indicated, any temperature- and/or pressure-dependent measurements described herein are at room temperature (23° C.) and atmospheric pressure.

The large, sharp and reversible strain-induced change in the conductance/resistance of the composites makes them well suited for use as active materials in strain sensors, the basic components of which comprise a layer of the composite and a probe configured to measure a change in the electrical conductance of the composite. (Such probes may measure the change in electrical conductance directly or indirectly, as in the case where a change in electrical resistance is measured directly and converted into a change in electrical conductance. The measured electrical conductance can then be converted into electrical conductivity, as shown in the Example.) The layer of the composite will typically, but not necessarily, take the form of a thin film. A strain sensor may comprise a pair of electrically conductive contacts, such as metal (e.g., gold) contacts, arranged such that they are separated by a gap. This gap is bridged by the composite, such that the composite provides a path for conducting electricity between the contacts in a conductance measurement circuit. The probe can then be connected across these contacts. The probe may comprise a parameter analyzer. An example of a suitable analyzer is the HP4155 semiconductor parameter analyzer. The strain sensor may further include a stretchable substrate upon which the layer of the composite is supported and a housing that isolates the composite from the ambient environment. The sensors may be connected to a data receiver via a wireless communication system to record, store and/or display the data.

During operation, the composite of the strain sensor is subjected to a tensile strain, which may be applied via a stretching force, whereby the electrically conducting particles in the polyether polyol matrix are reconfigured to reduce the electrical conductance through the composite.

The sensors may be used as stretch and/or pressure sensors to detect applied tensile and compressive strains in a variety of applications. For example, the sensors may be used in respiration monitors, energy storage devices, and biomedical and motion sensors. The sensors may be mounted to a part of a body (e.g., a human body) or mounted onto clothing to provide a wearable sensor.

Methods of making piezoresistive nanocomposites comprising CNTs in a PCM matrix are illustrated in the example that follows. More information can be found in *J. Mater. Chem. C*, 2016, 4, 460-467, the entire disclosure of which is incorporated herein by reference.

EXAMPLE

Piezoresistive polymer nanocomposites are highly desirable for flexible mechanical sensing applications. In this example, a family of multi-walled carbon nanotube (CNT)/elastomeric triisocyanate-crosslinked polytetrahydrofuran (ETC-PTHF) nanocomposites that are highly stretchable and highly sensitive to mechanical stimuli were designed, synthesized, and characterized.

The electrically conductive CNTs were initially uniformly dispersed in the ETC-PTHF matrix forming an electrical conducting pathway that could be regulated via a mechanical stimulus such as stretching. During the stretching process, the originally randomly distributed CNTs formed a preferential alignment along the stretching direction, while the PTHF component of the ETC-PTHF underwent an amorphous-to-crystalline transition. The strain-induced microstructure change adversely affected the CNT conducting pathways such that the electrical conductivity of the CNT/ETC-PTHF nanocomposites was reduced. These unique characteristics make the highly stretchable CNT/ETC-PTHF nanocomposites very sensitive to mechanical stimuli. For instance, the electrical conductivity of the 15 wt. % nanocomposites changed up to 7.3%, 29.2%, 19.76, 169.2 and 1291 times when subjected to 1%, 5%, 50%, 250%, and 500% stretching strain, respectively. The corresponding gauge factors of the 15 wt. % CNT/ETC-PTHF nanocomposites under 1%, 5%, 50%, 250%, and 500% stretching strain were 10.0, 11.2, 74.6, 839.3 and 8491, respectively. The nanocomposite film was able to detect a mechanical stimulus (poking) weaker than the landing force of a mosquito. Furthermore, the nanocomposite film demonstrated rapid and highly sensitive responses to a continuous finger motion. Compared with previously reported conductive nanofiller/polymer nanocomposites, these novel CNT/ETC-PTHF nanocomposites demonstrate several outstanding features, including ease of fabrication, low cost detection limit, excellent stretchability, and high sensitivity, thereby making them useful for applications in electronic skins, electronic textiles, and biomedical detectors.

Results and Discussion

Preparation and Characterization of the CNT/ETC-PTHF Nanocomposites

Figures 6A, 6B:
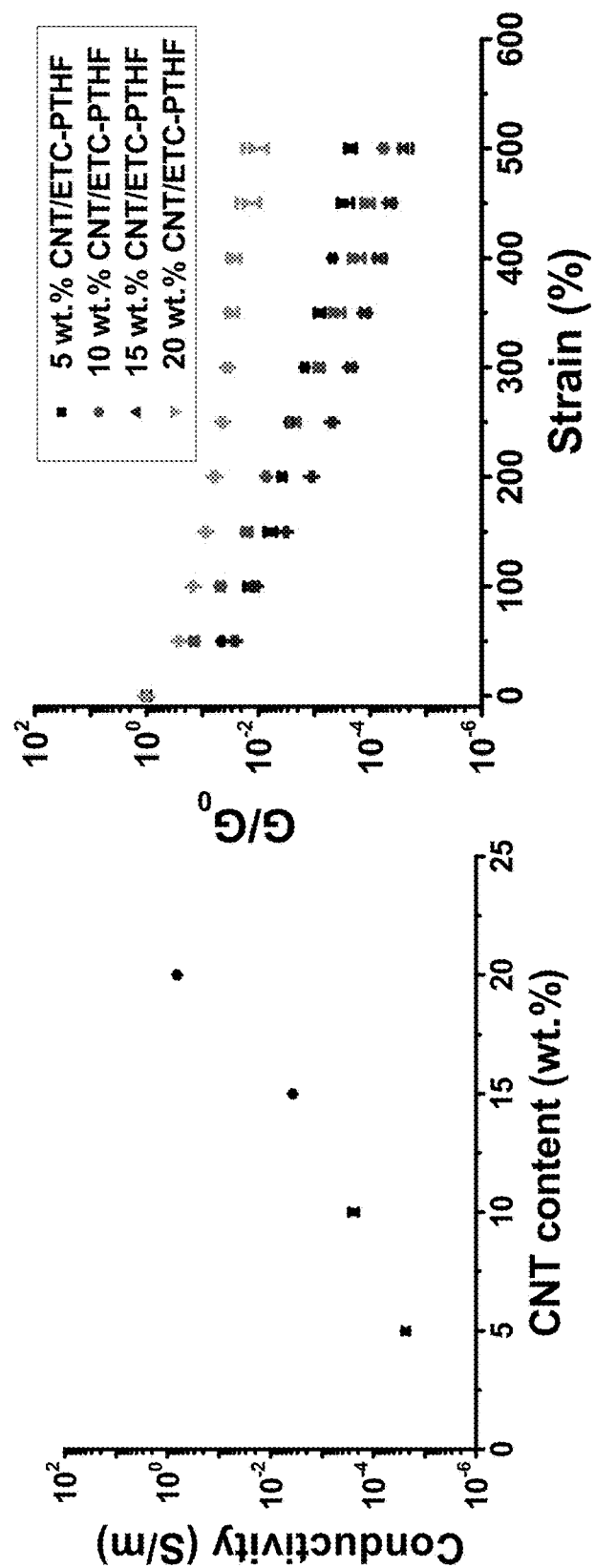
FIG. 6A. Dependence of the initial electrical conductivity on CNT loading content for CNT/ETC-PTHF nanocomposite films with different CNT loadings.
FIG. 6B. The change in electrical conductance of the CNT/ETC-PTHF nanocomposite films as a function of tensile strain.
Figures 6C, 6D:
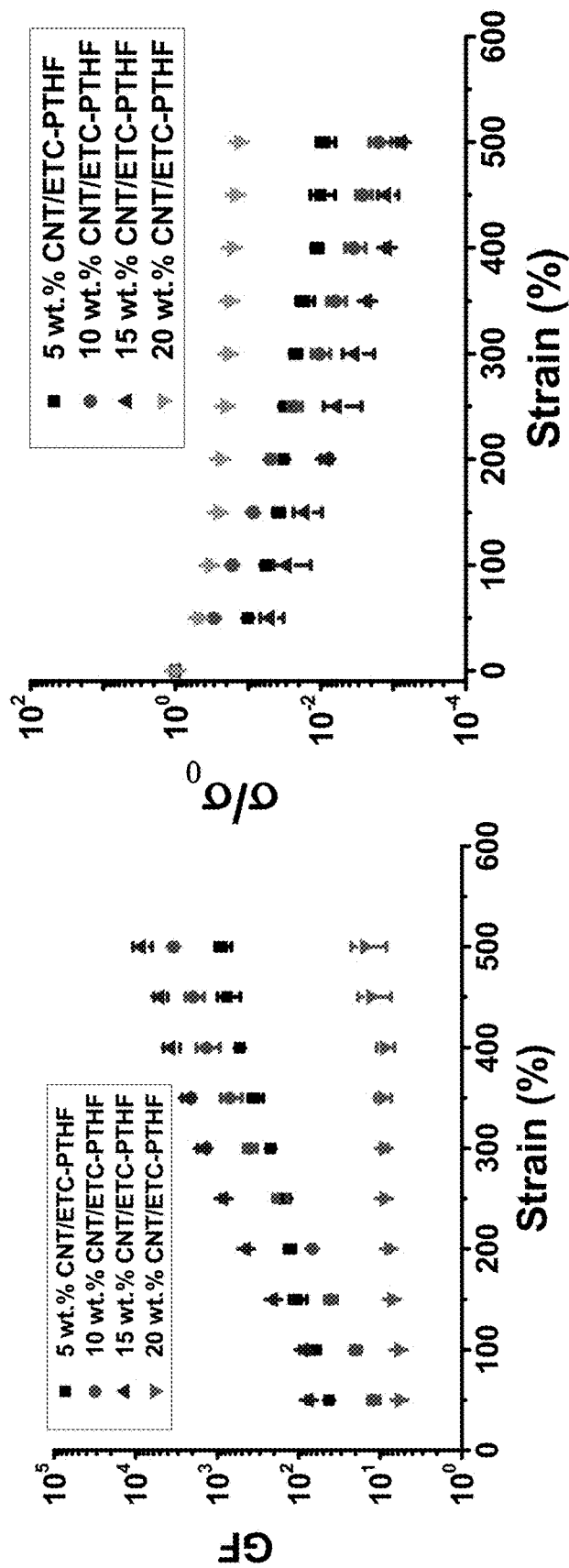
FIG. 6C. The gauge factors of the CNT/ETC-PTHF nanocomposite films as a function of tensile strain.
FIG. 6D. The change in electrical conductivity of the CNT/ETC-PTHF nanocomposite films as a function of tensile strain.
Figure 9A:
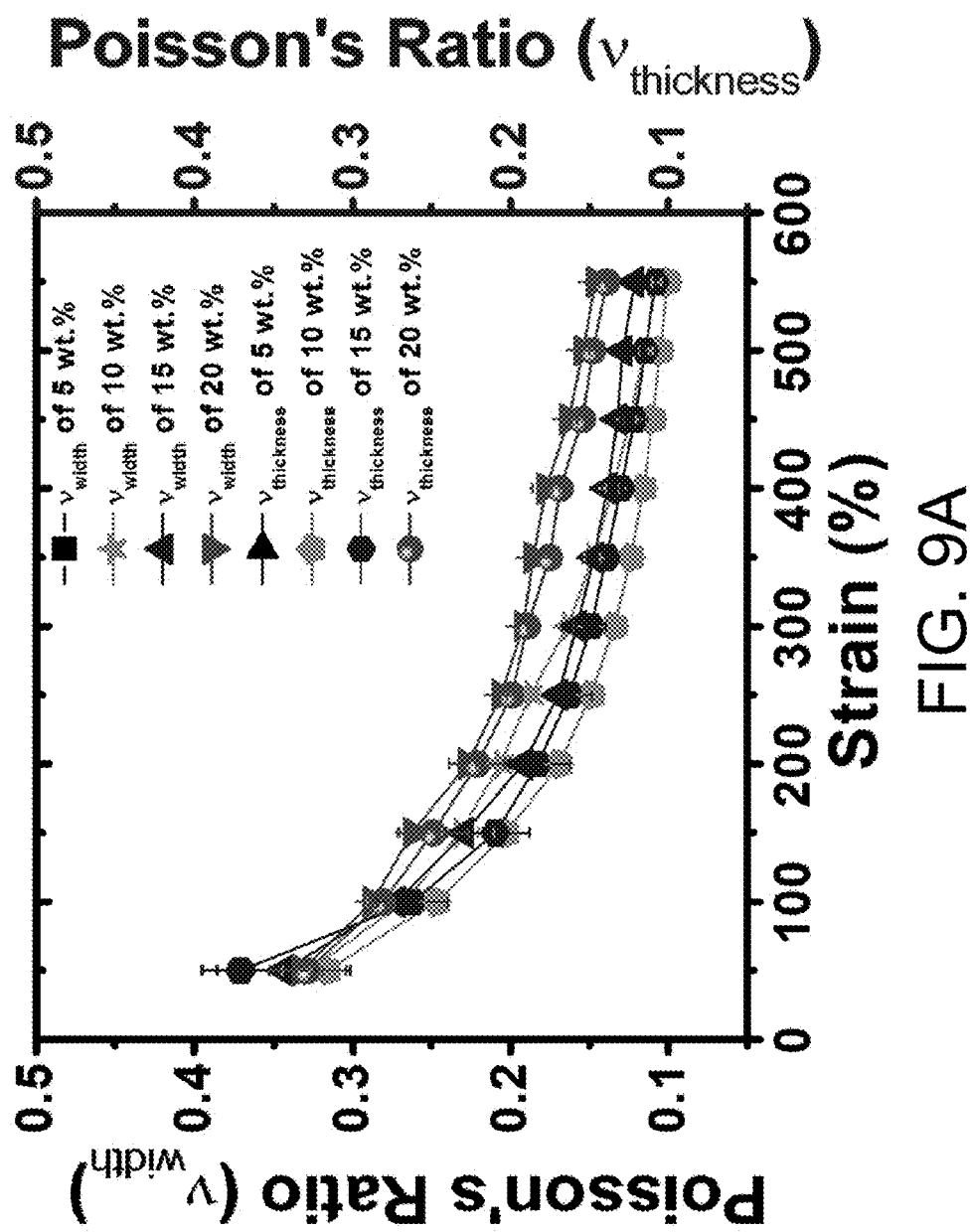
FIG. 9A. The Poisson ratios of CNT/ETC-PTHF nanocomposites with various CNT loading contents (5 to 20%), which were measured from both width change (left, $v_{width}$) and thickness change (right, $v_{thickness}$) as a function of tensile strain (large strain region ranging from 50% to 550%).

Highly stretchable and highly sensitive CNT/ETC-PTHF nanocomposite films were prepared by mixing p-methoxyphenyl functionalized CNTs and ETC-PTHF under ultrasonication in a petri dish followed by heating. The ETC-PTHF used in this study was synthesized using di-functional PHTF and tri-functional TTI. The chemical structure of the obtained nanocomposites was confirmed by FTIR analysis. As shown in FIG. 6A, the electrical conductivity of the resulting CNT/ETC-PTHF nanocomposite films increased with the loading content of CNTs (ranging from 5 to 20 wt. %). This result confirms that better electrical conducting pathways were formed with more CNTs in the ETC-PTHF matrix. To investigate the response of the CNT/ETC-PTHF nanocomposites on mechanical stimuli, the electrical conductivities of the nanocomposite films subjected to a wide range of tensile strains were measured. FIG. 6B shows the electrical conductance changes ($G/G_0$) of the nanocomposite films with different CNT loading levels (i.e., 5, 10, 15, and 20 wt. %) during the stretching processes. The electrical conductance of these nanocomposites decreased dramatically when the tensile strain increased. For instance, the electrical conductance of the 15 wt. % CNT/ETC-PTHF nanocomposite decreased 10.1%, 35.8%, 38.31, 2099 and 42455 times corresponding to a strain of 1%, 5%, 50%, 250%, and 500%, respectively. In contrast, the gauge factors of these nanocomposites increased with the tensile strain as shown in FIG. 6C. For instance, the gauge factors of the 15 wt. % CNT/ETC-PTHF nanocomposite were 10.0, 11.2, 74.6, 839.3 and 8491 corresponding to a strain of 1%, 5%, 50%, 250%, and 500%, respectively. In order to accurately calculate the electrical conductivity changes of the nanocomposite films in response to the varying tensile strains during the stretching process, the Poisson's ratio of the nanocomposite films was calculated by measuring the thickness and width changes induced by the longitudinal tensile strain. The electrical conductivity was calculated according to Equation 1 based on the measured electrical data and the Poisson's ratios. Detailed information on the derivation of Equation 1 is provided in the Supporting Information. The equation for the conductivity ($\sigma$) of the stretchable CNT/ETC-PTHF nanocomposites is as follows, $$\sigma = G \frac{L_0(1+\varepsilon_L)}{W_0 T_0 (1-\varepsilon_L \nu_{thickness})(1-\varepsilon_L \nu_{width})} \quad (1)$$

where G is the conductance of the stretchable CNT/ETC-PTHF nanocomposite; $\varepsilon_L$ is the longitudinal direction strain; and $L_0$, $W_0$, and $T_0$ are the initial length, thickness, and width of the film, respectively. (See, D. J. Lipomi, J. A. Lee, M. Vosgueritchian, B. C.-K. Tee, J. A. Bolander and Z. Bao, *Chem. Mater.*, 2012, 24, 373-382.) The parameter $\nu_{thickness}$ is the Poisson's ratio measured by tracking the thickness change, and $\nu_{width}$ is the Poisson's ratio measured by tracking the width change. As shown in FIG. 9A, the Poisson's ratios decreased with an increasing tensile strain. Similar to the electrical conductance changes shown in FIG. 6B, the electrical conductivities of the nanocomposite films with different CNT loading levels also decreased with increasing tensile strains (FIG. 6D). For example, the decrease of electrical conductivity for the 15 wt. % nanocomposite was 7.3%, 29.2%, 19.76, 169.2 and 1291 times under 1%, 5%, 50%, 250%, and 500% strain, respectively. Additionally, while the magnitude of changes in the electrical conductivity for the CNT/ETC-PTHF did not vary drastically for the nanocomposites with 5, 10, and 15 wt. % CNTs, particularly when the strain was below 300%, the magnitude of changes in the electrical conductivity for the CNT/ETC-PTHF with 20 wt. % CNTs was consistently lower than the nanocomposites with lower CNT loading levels. This was likely due to the fact that numerous CNT conducting pathways were formed at high CNT loading levels (e.g., 20 wt. %). Therefore, the strain-induced microstructure changes, including the CNT alignment and the formation of PTHF crystallites, did not drastically damage the overall CNT conductive pathway.

Figure 6E:
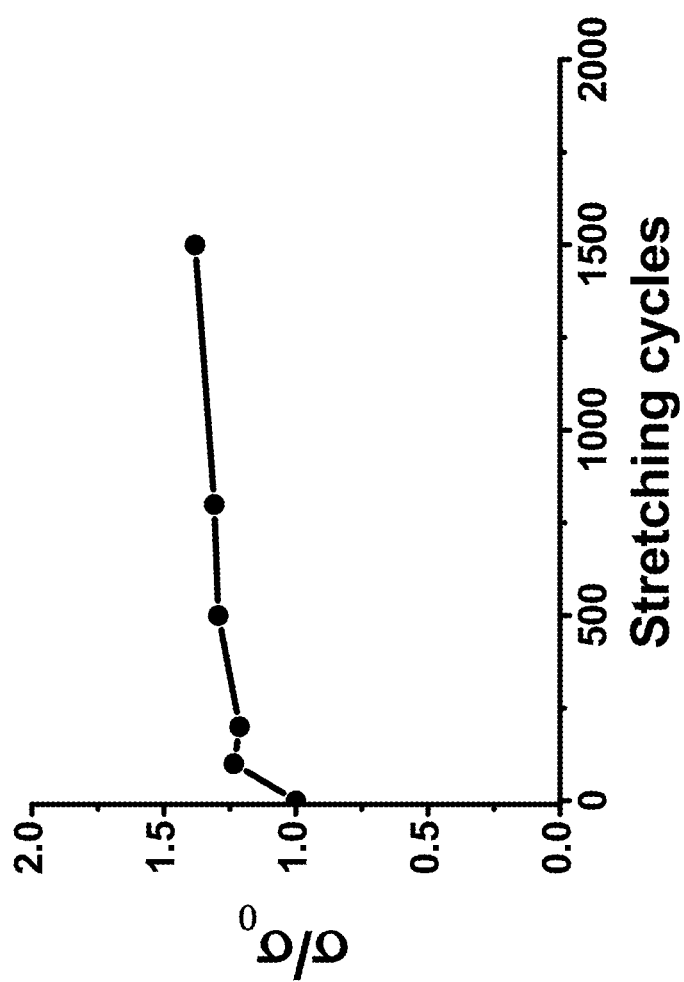
FIG. 6E. The change in electrical conductivity ($\sigma/\sigma_0$) of the 15 wt. % CNT/ETC-PTHF nanocomposite film after recurrent stretching cycles, $\epsilon$=10%.
Figure 6G:
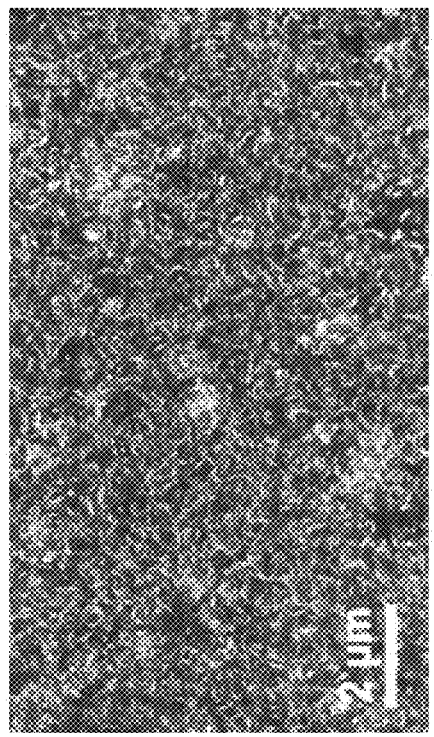
FIG. 6G. An SEM image of the 15 wt. % CNT/ETC-PTHF nanocomposite after 1600 stretching cycles, $\epsilon$=10%.
Figure 6F:
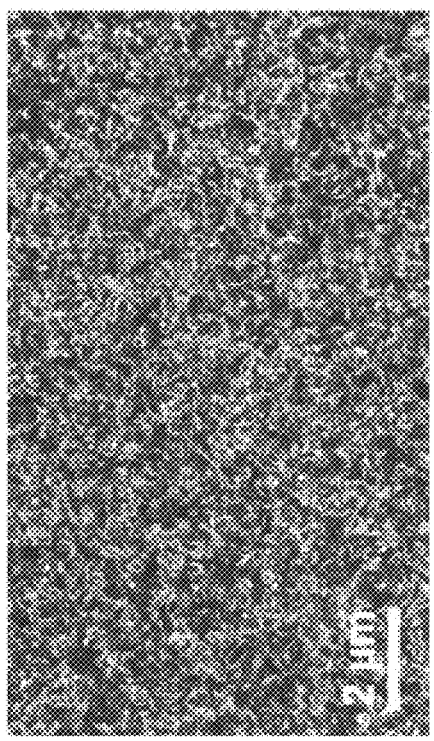
FIG. 6F. An SEM image of the initial 15 wt. % CNT/ETC-PTHF nanocomposite.
Figure 13:
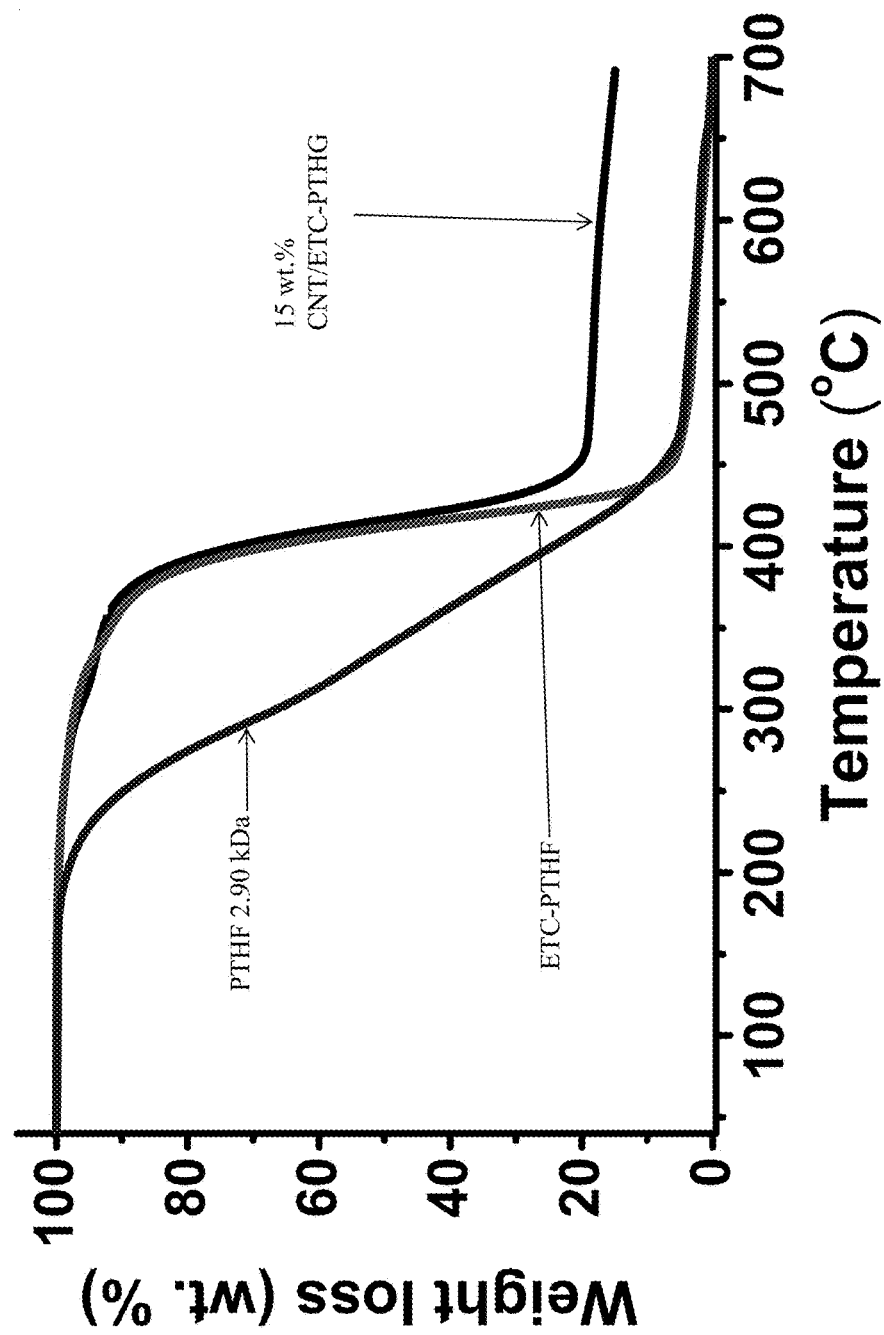
FIG. 13. The thermogravimetric analysis (TGA) curves of PTHF (2.9 kDa), ETC-PTHF and 15 wt. % CNT/ETC-PTHF nanocomposites.
Figure 14:
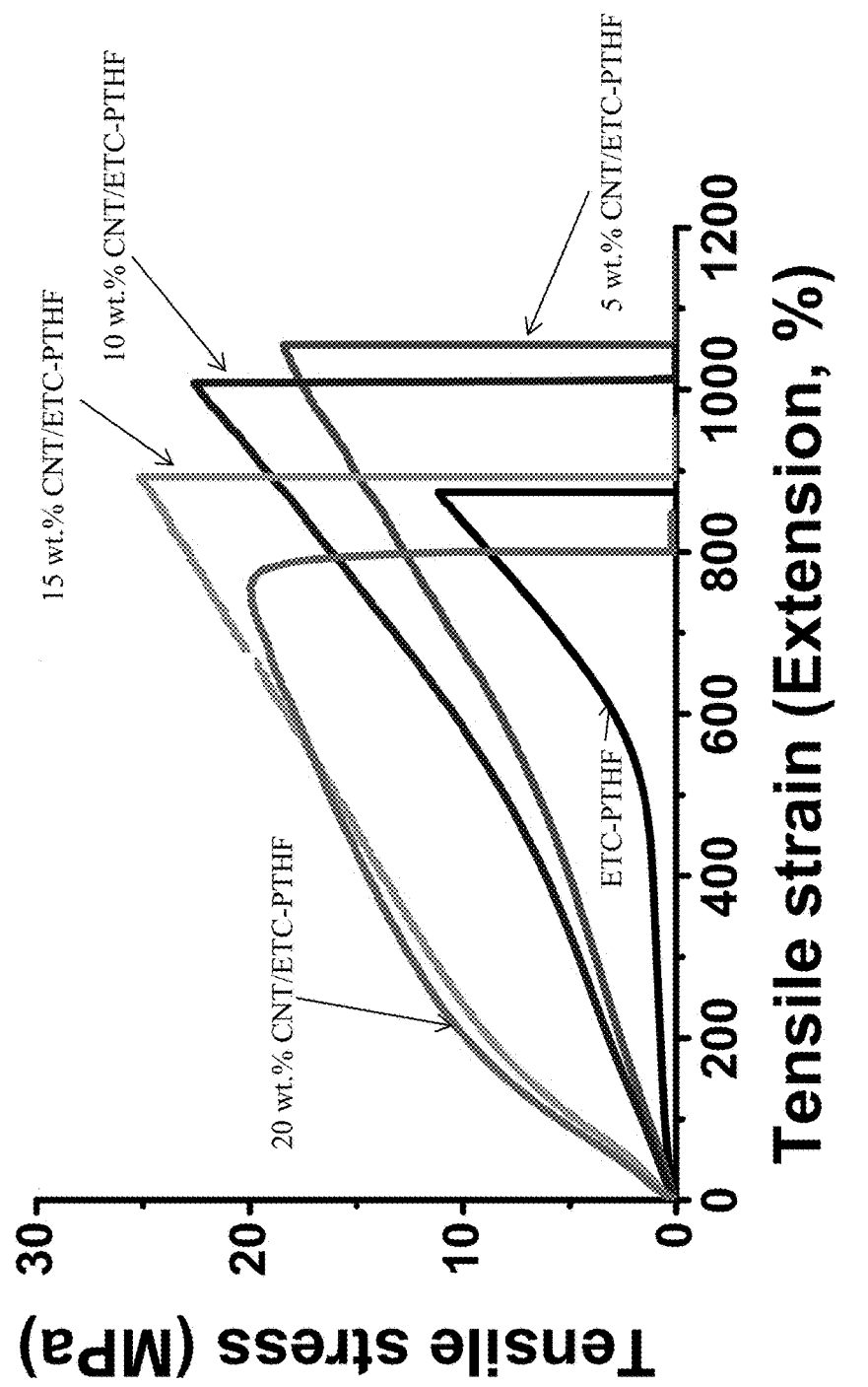
FIG. 14. The tensile stress-strain curves of the CNT/ETC-PTHF nanocomposites (according to ASTM: D882).

Further experiments were carried out to investigate the long term reliability and durability of the nanocomposites. FIG. 6E shows the electrical conductivity change of the 15 wt. % CNT/ETC-PTHF nanocomposite film as a function of the number of stretching cycles at a tensile strain of 10%. It was observed that the electrical conductivity of the nanocomposite film increased slightly within the first 100 cycles, and then remained nearly unchanged during the subsequent 1500 cycles. Overall, the electrical conductivity of the nanocomposite film measured at 0% strain only increased by 38% after 1600 stretching cycles. The remarkable cycling stability exhibited by the nanocomposite films with excellent stretchability and sensitivity to mechanical stimuli is beneficial for various applications. The increase in electrical conductivity during the cyclic test can be attributed to a slight change in the connectivity of the electrically conductive CNT network. Scanning electron microscopy (SEM) was used to examine the influence of the cyclic stretch on the microstructure of the CNT/ETC-PTHF nanocomposites. As shown in FIG. 6F and FIG. 6G, the microstructure of the nanocomposite films and the CNT distribution did not show obvious changes after 1600 consecutive stretches. Additionally, as shown in FIG. 13, the temperature of the CNT/ETC-PTHF nanocomposite corresponding to 5 wt. % weight loss was 315° C., demonstrating that the nanocomposite had good thermal stability. The tensile properties of the CNT/ETC-PTHF nanocomposites are shown in FIG. 14 and Table 1. For the CNT/ETC-PTHF nanocomposites, the Young's modulus increased while the tensile strain-at-break decreased with the CNT loading content. The tensile strength-at-break initially increased with the CNT content, but decreased somewhat beyond 15 wt. %. However, overall, the mechanical properties of the CNT/ETC-PTHF nanocomposites were very good. For example, the 15% CNT/ETC-PTHF nanocomposite had a Young's modulus of 4.26±0.11 MPa, tensile strength-at-break of 25.16±1.62 MPa, and tensile strain-at-break of 8.92±1.39 times, suggesting that the CNT/ETC-PTHF nanocomposites had excellent stretchability and flexibility. All of these characteristics make the CNT/ETC-PTHF nanocomposites desirable for practical applications.

TABLE 1

Mechanical properties of CNT/ETC-PTHF nanocomposites.

| Sample | Tensile strength-at-break (MPa) | Tensile strain-at-break (mm/mm) | Young's modulus (E-modulus) (MPa) |
| --- | --- | --- | --- |
| ETC-PTHF | 11.14 ± 0.87 | 8.74 ± 1.92 | 0.78 ± 0.04 |
| 5 wt. % CNT/ETC-PTHF | 18.42 ± 2.32 | 10.56 ± 2.14 | 1.25 ± 0.06 |
| 10 wt. % CNT/ETC-PTHF | 25.35 ± 3.01 | 10.09 ± 1.32 | 1.72 ± 0.03 |
| 15 wt. % CNT/ETC-PTHF | 25.16 ± 1.62 | 8.92 ± 1.39 | 4.26 ± 0.11 |
| 20 wt. % CNT/ETC-PTHF | 19.97 ± 3.08 | 7.54 ± 1.77 | 5.04 ± 0.04 |

Figure 7A:
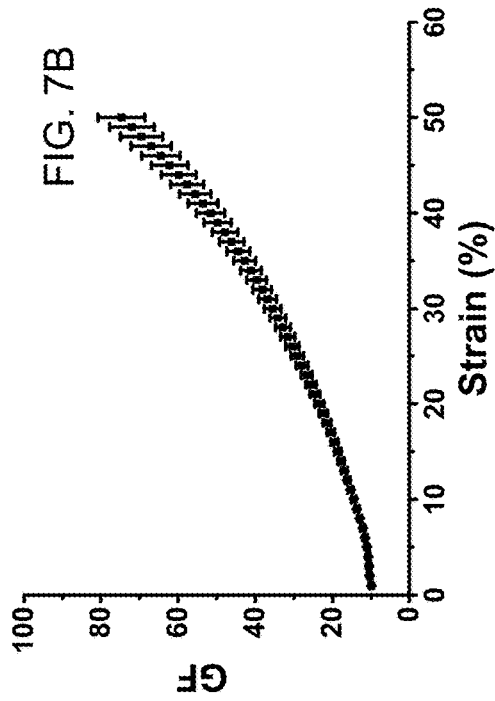
FIG. 7A. The change in electrical conductance of the 15 wt. % CNT/ETC-PTHF nanocomposite film as a function of tensile strain ranging from 0 to 50%.
Figure 7B:
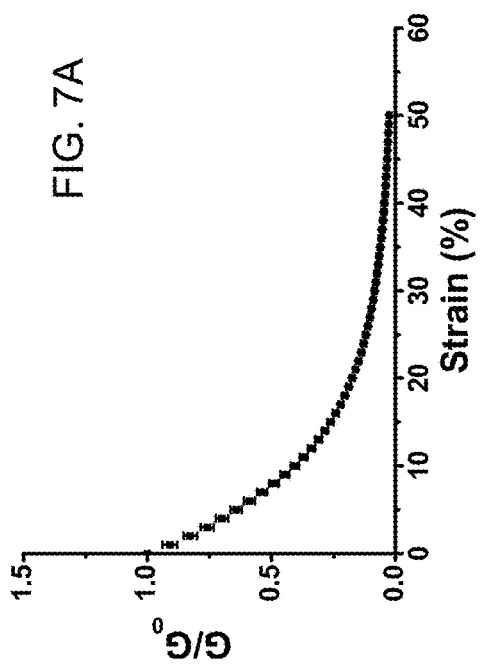
FIG. 7B. The gauge factor of the 15 wt. % CNT/ETC-PTHF nanocomposite film as a function of tensile strain ranging from 0 to 50%.
Figure 7C:
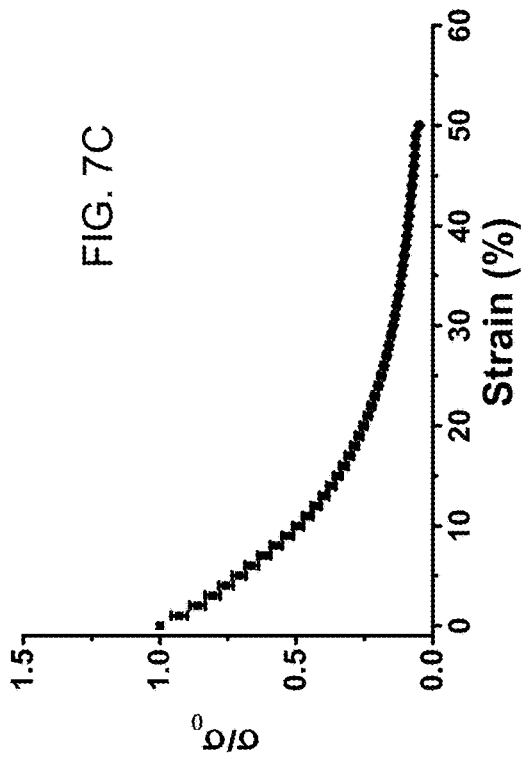
FIG. 7C. The change in electrical conductivity of the 15 wt. % CNT/ETC-PTHF nanocomposite film as a function of tensile strain ranging from 0 to 50%.
Figure 9B:
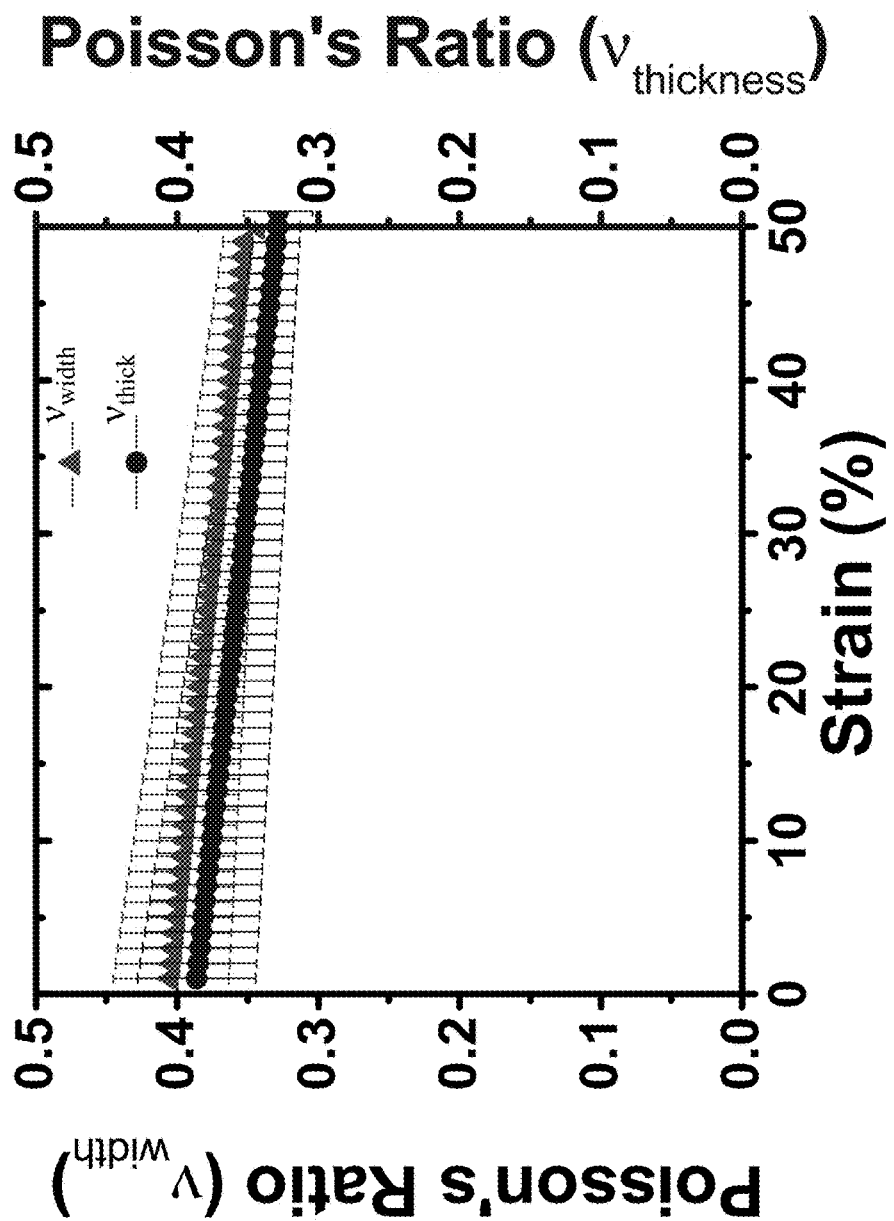
FIG. 9B. The Poisson ratios of the 15 wt. % CNT/ETC-PTHF nanocomposite as a function of the tensile strains (low strain region ranging from 1% to 50%).

In order to study the sensitivity of the CNT/ETC-PTHF nanocomposites, the electrical responses at low level strains (from 0 to 50%) for the 15 wt. % CNT/ETC-PTHF nanocomposite were also measured (FIGS. 7A-7C). The electrical conductance (FIG. 7A) consistently decreased, while the gauge factor (FIG. 7B) consistently increased with an increasing tensile strain. Under 1% and 5% strain, the electrical conductance of the 15 wt. % CNT/ETC-PTHF nanocomposite decreased 10.1% and 35.8%, respectively, with a corresponding gauge factor of 10.0 and 11.2, respectively. Additionally, based on the calculated Poisson's ratio as shown in FIG. 9B, the electrical conductivity of the 15 wt. % CNT/ETC-PTHF nanocomposite decreased 7.6% and 29.2%, respectively, under 1% and 5% strain (FIG. 7C).

Study of the Piezoresistive Mechanism

Figure 8A:
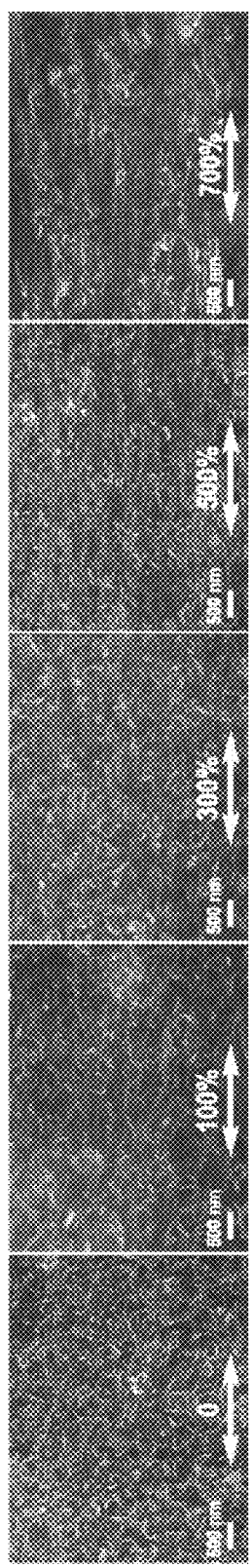
FIG. 8A. SEM images of the 15 wt. % CNT/ETC-PTHF nanocomposite film subjected to varying strains: 0%, 100%, 300%, 500%, and 700%.

To gain further insight into the electrical conductivity responses to stretching, the microstructure of the CNT/ETC-PTHF nanocomposites under different tensile strains were investigated using SEM. As shown in FIG. 8A, the CNTs in the nanocomposite underwent a rearrangement in response to the tensile strain. Initially, the CNTs, which mostly exhibited a coiled structure, were evenly distributed in the ETC-PTHF matrix. As the tensile strain was applied and increased, the coiled and entangled CNTs started to gradually uncoil, disentangle, and align along the stretching direction. This process could lead to a reduction in the overall electrical connectivity of the CNT network, or a reduction in the efficiency of electron tunneling among the CNTs, and thus a decrease in the electrical conductivity of the nanocomposite film.

Figure 8C:
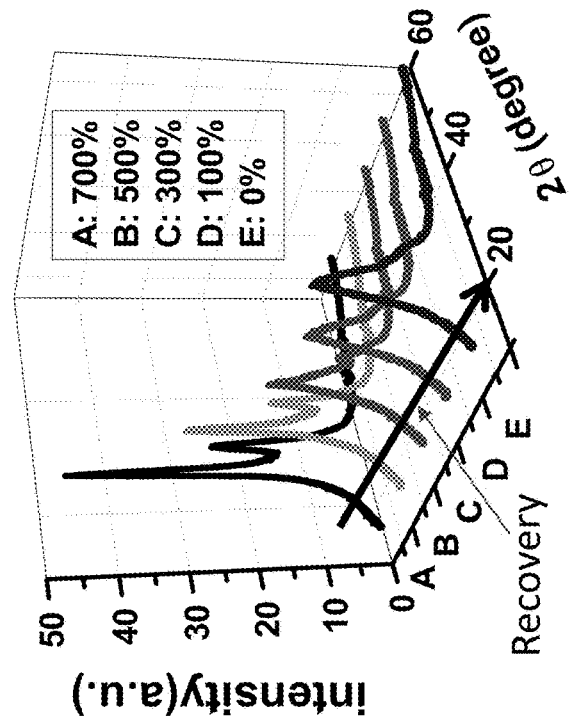
FIG. 8C. XRD curves of the 15 wt. % CNT/ETC-PTHF nanocomposite film during the re-tracking/recovery process.
Figure 8B:
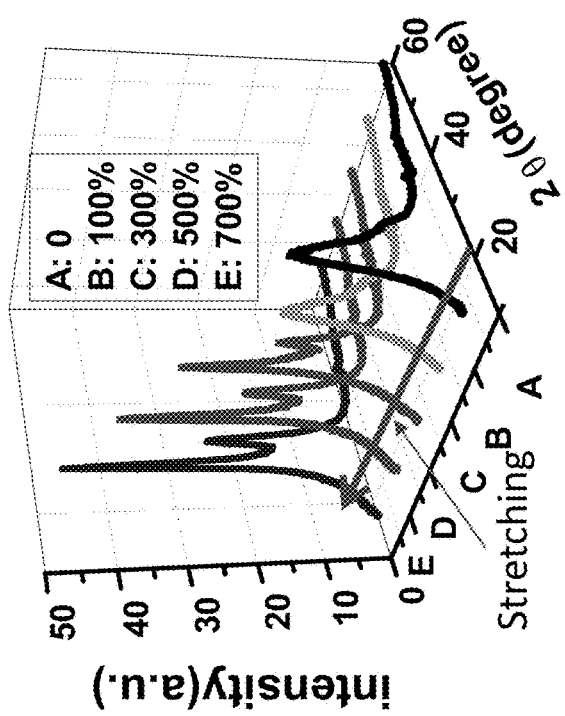
FIG. 8B. X-ray diffraction (XRD) curves of the 15 wt. % CNT/ETC-PTHF nanocomposite film during the stretching process.

Polarized light microscopy (PLM) and XRD were conducted to gain further insight into the mechanism of the piezoresistive effect exhibited by the CNT/ETC-PTHF nanocomposites. The PLM images of the pure ETC-PTHF film were collected at room temperature under different tensile strains. The first figure was dark, suggesting that the PTHF in the ETC-PTHF was amorphous, which is consistent with a DSC curve measured from room temperature showing no PTHF melting peak. This was attributed to the fact that the localized PTHF crystallization temperature in ETC-PTHF under zero strain was around −6.7° C. according to the DSC analyses. However, the other four PLM images indicated that PTHF crystallization occurred under various levels of tensile strains. Stain-induced PTHF crystallization could enhance the separation of the CNTs experiencing strain-induced alignment and reduce the electron tunneling efficiency among CNTs, thereby contributing to the observed decrease in the electrical conductivity. To further confirm the strain-induced crystallization phenomenon, a series of XRD scans were performed on the nanocomposite films under various tensile strain conditions (FIGS. 8B and 8C). As the tensile strain increased, two distinct diffraction peaks located at 2θ=19.9° and 24.4° were clearly observed corresponding to the (002) and (202) lattice planes of the PTHF crystalline structure, respectively. It was also found that the size of the PTHF crystallites increased with the tensile strain. For instance, when the tensile strain increased from 300% to 700%, according to the Scherrer equation as detailed in the Supporting Information, the effective crystallite size of the PTHF increased from 2.57 to 4.48 nm and from 2.79 to 3.26 nm, respectively, based on the two diffraction peaks (002) and (202) located at 19.9° and 24.4°, respectively. Conversely, these two sharp diffraction peaks gradually transformed into a broad peak after the tension was released, suggesting that the strain-induced PTHF crystallization was stain-dependent and is reversible. Therefore, while the piezoresistive effect exhibited by the CNT/ETC-PTHF nanocomposite is largely attributed to the strain-induced alignment of the CNTs causing a reduction in the connectivity of the CNT network, strain-induced PTHF crystallization may also contribute to this effect (FIG. 5).

Detection of Light Poking and Finger Bending Motions

Figure 10B:
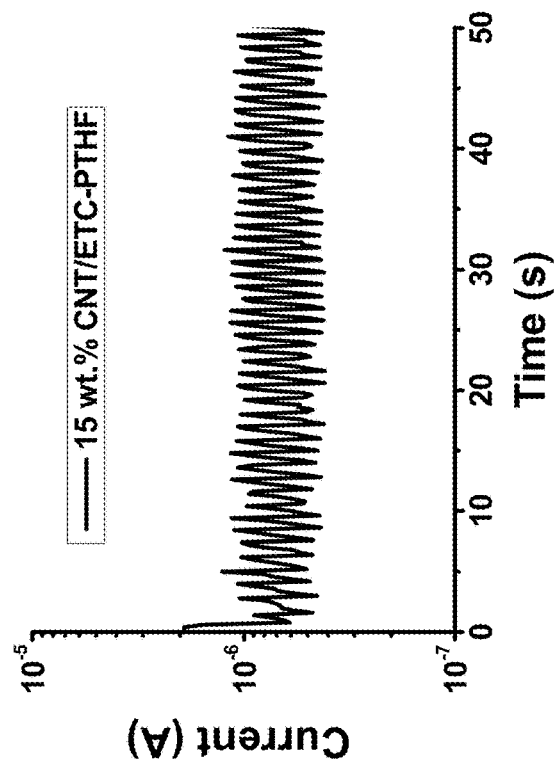
FIG. 10B. The electrical current in the bending finger movement of the 15 wt. % CNT/ETC-PTHF nanocomposite.
Figure 10A:
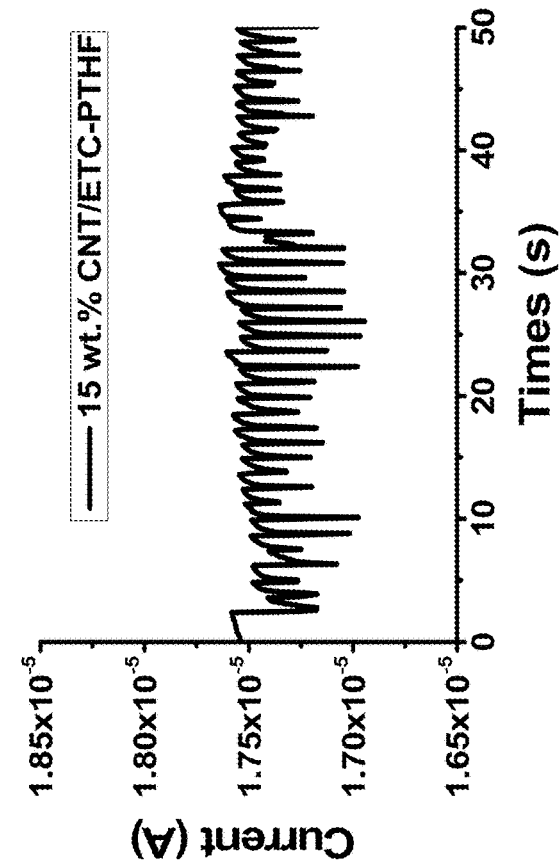
FIG. 10A. The electrical current response of the 15 wt. % CNT/ETC-PTHF nanocomposite in the poking motion.

In order to demonstrate the sensitivity of the CNT/ETC-PTHF nanocomposites for detecting weak mechanical stimuli, such as a light touch to human skin, a gentle poke test was carried out. A piece of the 15 wt. % CNT/ETC-PTHF nanocomposite film was mounted between two clips and then the film was poked very gently using a plastic stick with a square contact surface. During the poke test, the electrical current through the film was measured with a bias of 5 V. As shown in FIG. 10A, the 15 wt. % CNT/ETC-PTHF nanocomposite provided a very quick and accurate response to the gentle poking motion. Once a poke was applied to the film, the current through the film dropped immediately. Likewise, once the poke was released from the film, the current recovered promptly. The ratio of current change ranged from 1.3% to 3.6% corresponding to a poke pressure ranging from 125 to 328 Pa which was more sensitive than previously reported data (e.g., 1% change corresponding to 0.23 MPa), and the current responses of the nanocomposite film followed excellently with the cyclic poking stimuli. According to the literature, the pressure of a mosquito landing on human skin varies between 800 to 3,266 Pa. This poke test proved that the CNT/ETC-PTHF nanocomposite was sensitive enough to detect weak stimuli; for example, weaker than the pressure of a mosquito landing. (See, X. Q. Kong, J. L. Liu, W. J. Zhang and Y. D. Qu, AIP Adv., 2015, 5, 037101.)

Since this family of CNT/ETC-PTHF nanocomposites is highly sensitive, stretchable, flexible, and human-friendly (biocompatible), they can be used as strain sensing materials for wearable and flexible human motion detection devices. The motion of the human body can reach a large strain ($\varepsilon$>50%) and bending angle ($\theta$>150°), which needs to be accommodated by the motion sensors. In order to demonstrate the capability of the piezoresistive CNT/ETC-PTHF nanocomposite films for detecting the bending motion of human joints, a 15 wt. % CNT/ETC-PTHF nanocomposite film was mounted on a forefinger which underwent a straight-to-bend motion process. In this dynamic test, recurrent bending/relaxation cycles (with the bending angle ranging from 0 to 90°) were applied to the index finger while the electrical current through the nanocomposite film was measured at a constant voltage bias of 5 V. As shown in FIG. 10B, the 15 wt. % CNT/ETC-PTHF nanocomposite responded to the bending motion with good sensitivity ($I_0/I$=4.61) and could easily follow the quick motion of the finger. In comparison with previously reported data (e.g., a $\Delta R/R_0$ of approximately 30% in response to the index and middle finger motions), the CNT/ETC-PTHF nanocomposite film had a $\Delta R/R0$ of 360% in response to the finger bending motion, which was much more sensitive. (See, X. Li, F. Gittleson, M. Carmo, R. C. Sekol and A. D. Taylor, ACS Nano, 2012, 6, 1347-1356.) There was excellent agreement between the quick motion of the figure and the electrical current response of the CNT/ETC-PTHF nanocomposite film without apparent drifting or hysteresis. This experiment confirms that the CNT/ETC-PTHF nanocomposite film exhibited a fast response and an outstanding repeatability. Therefore, these nanocomposites could be used as an intelligent and accurate sensing material for various applications including biomechanics, kinesiology, and bionics.

Figure 11:
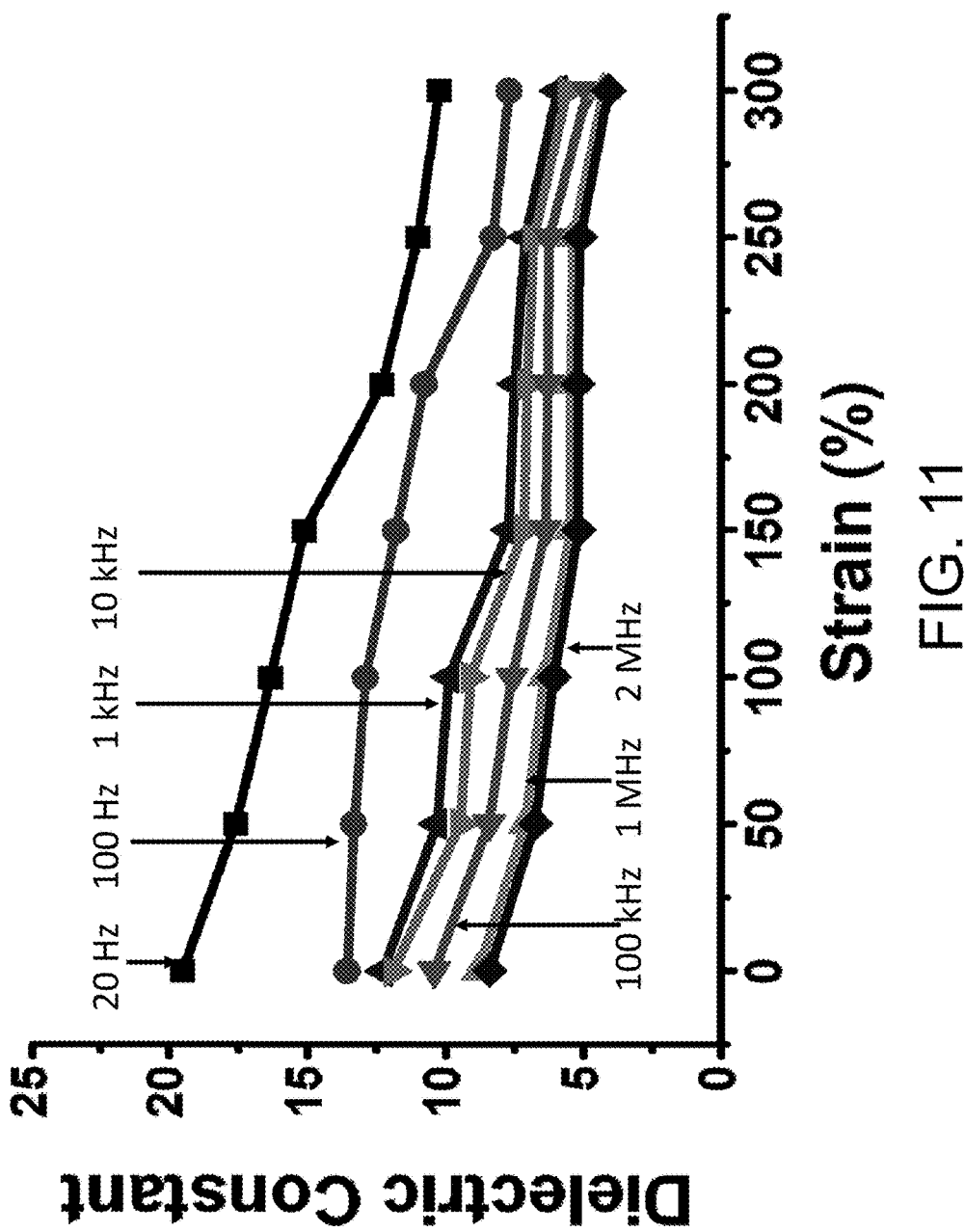
FIG. 11. The change in dielectric constant ($\epsilon$) of the 15 wt. % CNT/ETC-PTHF nanocomposite as a function of tensile strain measured at different frequencies.

The dielectric constant of the 15 wt. % CNT/ETC-PTHF nanocomposites as a function of the tensile strain was also measured at various frequencies ranging from 20 Hz to 2 MHz. As shown in FIG. 11, the dielectric constant decreased with increasing stretching strains. This finding suggests that the dielectric property of the CNT/ETC-PTHF nanocomposites can be regulated by an external strain. Therefore, such materials may also be used for applications such as energy storage devices with mechanical-tunable dielectric properties.

CONCLUSIONS

A family of unique piezoresistive CNT/ETC-PTHF nanocomposites exhibiting high stretchability and high sensitivity as well as high stability to mechanical stimuli was developed using a simple and low cost fabrication process. The excellent piezoresistive performance possessed by the CNT/ETC-PTHF nanocomposites may be contributed to the strain-induced CNT re-organization including uncoiling, disentanglement, and alignment of the CNTs. Stain-induced PTHF crystallization contributed to the observed piezoresistive effect. The piezoresistive CNT/ETC-PTHF nanocomposite films demonstrated significant and fast responses in electrical conductivity to joint bending and light poking motions, making them potentially useful for various applications including electronic bionics skin, electronic textiles, and biomedical detectors.

Experimental Section

Synthesis of Surface-Functionalized CNTs

Figure 12:
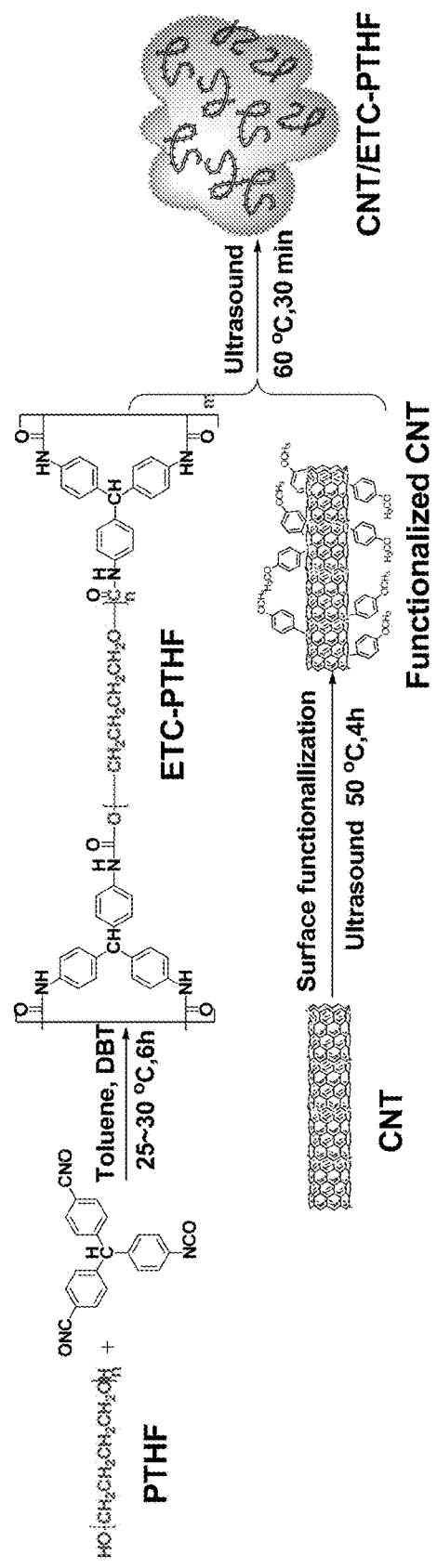
FIG. 12. The synthesis scheme of a surface-functionalized CNT, highly elastomeric ETC-PTHF, and a CNT/ETC-PTHF nanocomposite film (thickness: 0.3~0.4 mm).

As shown in the scheme in FIG. 12, CNTs were functionalized with 4-methoxyphenyl diazonium according to a method reported in the literature. (See, J. Park and M. Yan, Acc. Chem. Res., 2013, 46, 181-189.) First, 4-methoxyphenyl diazonium was synthesized by dissolving 3 mmol p-anisidine in 20 mL DI water, followed by adding 0.75 mL of concentrated hydrochloric acid and 3 mmol sodium nitrite under constant stirring for 30 min. Then, 100 mg of CNTs and 10 mg of sodium dodecyl sulfonate (used as a surfactant) were dispersed in 100 mL of deionized water under sonication. Thereafter, the freshly made 4-methoxyphenyl diazonium solution was added to the CNT solution dropwise under sonication. The mixture was ultrasonicated at 300 W for 5 h at 50° C., and then stirred overnight at ambient temperature. It was then filtered and washed in succession with water and ethanol. The resulting product—i.e., the functionalized CNTs—were dried overnight in a freeze-drier before use.

Synthesis of the Highly Elastomeric Triisocyanate-Cross-linked Polytetrahydrofuran (ETC-PTHF)

Scheme 1 shows the synthesis route of the ETC-PTHF. The synthesis reaction was conducted in dried glassware under an inert nitrogen ($N_2$) atmosphere. A mass of 2.9 g of dried PTHF (2.9 kDa), 245 mg TTI, and 3.0 mg dibutyltin dilaurate (DBT) were mixed in freshly distilled toluene and stirred for 6 h in an $N_2$ atmosphere at 25~30° C. to obtain highly elastomeric ETC-PTHF.

Synthesis of the CNT/ETC-PTHF Nanocomposites

A specific amount of functionalized CNTs was dispersed in DMF via ultrasonication for one hour (Hielscher UP 400S, Bernau bei Berlin, Germany, 400 W). The resulting CNT solution and the ETC-PTHF toluene solution prepared earlier were ultrasonicated for 30 min at 60° C. to obtain a well-dispersed suspension. Subsequently, the functionalized CNT/ETC-PTHF solution was heated on a hot plate at 85° C. The resulting CNT/ETC-PTHF nanocomposite film was further dried for 24 h at 80° C. under vacuum (0.0010 mBar).

Characterization

The chemical structures of the CNTs, ETC-PTHF, and CNT/ETC-PTHF nanocomposites were analyzed using a Fourier transform infrared (FTIR) spectrophotometer (Bruker Tensor 27 FT-IR) at room temperature. The electrical conductivities of the nanocomposite films were measured using an HP4155 semiconductor analyzer. The two ends of the nanocomposite film were covered with silver paste serving as electrical contacts. The microstructure of the CNT/ETC-PTHF nanocomposite film was studied using a scanning electron microscope (LEO GEMINI 1530 SEM, Zeiss, Germany). Differential scanning calorimetry (DSC) analyses were performed in an $N_2$ atmosphere using a Q20 DSC thermal analyzer (TA Instruments, DE USA) from 0 to 100° C. at a heating rate of 5° C./min. The thermal stability of these films were characterized via thermogravimetric analysis (TGA) using a TGA/Q50 thermal analyzer (TA Instruments, DE USA). Approximately 10 mg of the nanocomposite films were heated from 30 to 700° C. at a heating rate of 10° C./min in an $N_2$ atmosphere. X-ray diffraction (XRD, Bruker D8-Discovery) analyses were carried out on the samples from 5° to 60° (diffraction angles, 2θ) under different strains. Polarized optical images of the crystalline ETC-PTHF were taken using a polarized light microscope (EN60950, Diagnostic Instruments Inc., MI, USA).

Supporting Information

Materials

Multi-walled carbon nanotubes (CNTs) (inner diameter: 4 nm, length: >1 µm, number of walls: 3-15, bulk density: 140-230 kg/m$^3$, purity: >99%) were kindly provided by Bayer Materials Science AG, 51368 Leverkusen, Germany. Triphenylmethanetriiso-cyanate (TTI, Boc Sciences, NY, USA) and dibutyltin dilaurate (DBT, Alfa Aesar, Mass., USA) were used as received. The materials p-anisidine, sodium dodecyl sulfonate, and toluene were purchased from Fisher Scientific (Bellefonte, Pa.). Polytetrahydrofuran (PTHF 2.9 kDa) was purchased from Sigma-Aldrich (St. Louis, Mo.). PTHF 2.9 kDa was dried at 100° C. under a high vacuum (0.010 MPa) for 2 h before use. Toluene was dried for 48 h using a 5 Å molecular sieve and then distilled prior to use. All other reagents were of analytical grade and were used as received.

Derivation of the Equation Used to Calculate the Conductivity $$\sigma = \frac{1}{\rho} = \frac{1}{R}\frac{L}{WT} = \frac{L_0 + \Delta L}{R(w_0 + \Delta w)(T_0 + \Delta T)} = \quad (S1)$$

$$G \frac{L_0\left(1 + \frac{\Delta L}{L_0}\right)}{W_0 T_0\left(1 + \frac{\Delta w}{w_0}\right)\left(1 + \frac{\Delta T}{T_0}\right)}$$

$$= G \frac{L_0(1 + \varepsilon_L)}{W_0 T_0(1 + \varepsilon_w)(1 + \varepsilon_T)} =$$

$$G \frac{L_0(1 + \varepsilon_L)}{W_0 T_0 \varepsilon_L^2\left(\frac{1}{\varepsilon_L} + \frac{\varepsilon_w}{\varepsilon_L}\right)\left(\frac{1}{\varepsilon_L} + \frac{\varepsilon_T}{\varepsilon_L}\right)}$$

$$= G \frac{L_0(1 + \varepsilon_L)}{W_0 T_0 \varepsilon_L^2\left(\frac{1}{\varepsilon_L} - \upsilon_{thickness}\right)\left(\frac{1}{\varepsilon_L} - \upsilon_{width}\right)}$$

$$= G \frac{L_0(1 + \varepsilon_L)}{W_0 T_0(1 - \varepsilon_L \upsilon_{thickness})(1 - \varepsilon_L \upsilon_{width})}$$

where σ is the conductivity of the stretchable CNT/ETC-PTHF nanocomposites, G is the conductance of the stretchable CNT/ETC-PTHF nanocomposite, and $\varepsilon_L$ is the longitude direction strain. The parameters $L_0$, $T_0$, and $W_0$ are the initial length, thickness, and width of the sample, respectively. The parameter $\upsilon_{thickness}$ is the Poisson's ratio of thickness and $\upsilon_{width}$ is the Poisson's ratio of width.

Thermal Stability

The TGA curves of PTHF (2.9 kDa), ETC-PTHF and 15 wt. % CNT/ETC-PTHF nanocomposites are shown in FIG. 13. The most significant weight loss occurred between 394 and 421° C., which was attributed to the degradation of the PTHF chains. Compared with the char yield of ETC-PTHF, the 15 wt. % CNT/ETC-PTHF nanocomposite produced 15 wt. % more carbonaceous residues after thermal degradation, which was equivalent to the amount of CNTs incorporated in the CNT/ETC-PTHF nanocomposite.

Scherrer Equation

The effective crystallite size L in the PTHF-based nanocomposites was estimated from Scherrer's equation, $$L = \frac{\alpha \lambda}{\beta \cos \theta_m} \quad (S2)$$

where α is the coefficient accounting for the form of correlation zone (α=2×(ln 2/π)$^{1/2}$≈0.93), β is the full width at half maximum (FWHM) of the diffraction peak expressed in radians, and $\theta_m$ is half of the diffraction angle (2θ) corresponding to the position of the diffraction peak. (See, N. I. Lebovka, E. A. Lysenkov, A. I. Goncharuk, Y. P. Gomza, V. V. Klepko and Y. P. Boiko, *J. Compos. Mater.* 2011, 45, 2555 and A. L. Patterson, *Phys. Rev.* 1939, 56, 978.) The characteristic peaks at 19.9° and 24.4° in the XRD spectra were adopted to calculate L.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A strain sensor comprising:
    a composite comprising crosslinked polyether polyol and electrically conductive particles dispersed in the crosslinked polyether polyol, wherein the crosslinked polyether polyol is crosslinked by branched, urethane group-containing linkages or by branched, ether group-containing linkages; and
    a probe configured to measure a strain-induced change in the electrical conductance of the composite.

2. The sensor of claim 1, wherein the electrically conductive particles are carbon particles.

3. The sensor of claim 2, wherein the carbon particles comprise carbon nanotubes.

4. The sensor of claim 2, wherein the carbon particles comprise graphene.

5. The sensor of claim 1, wherein the electrically conductive particles are metal particles.

6. The sensor of claim 1, wherein the composite is characterized in that its electrical conductivity decreases by a factor of at least 1000 under a tensile strain of 500%.

7. The sensor of claim 1, wherein the crosslinked polyether polyol is crosslinked by the branched, urethane group-containing linkages.

8. A sensor comprising:
a composite comprising crosslinked polytetrahydrofuran and electrically conductive particles dispersed in the crosslinked polytetrahydrofuran; and
a probe configured to measure a strain-induced change in the electrical conductance of the composite.

9. The sensor of claim 8, wherein the polytetrahydrofuran is crosslinked by branched, urethane group-containing linkages.

10. The sensor of claim 9, wherein the urethane groups are part of an aryl group.

11. The sensor of claim 10, wherein the crosslinked polytetrahydrofuran has the structure:

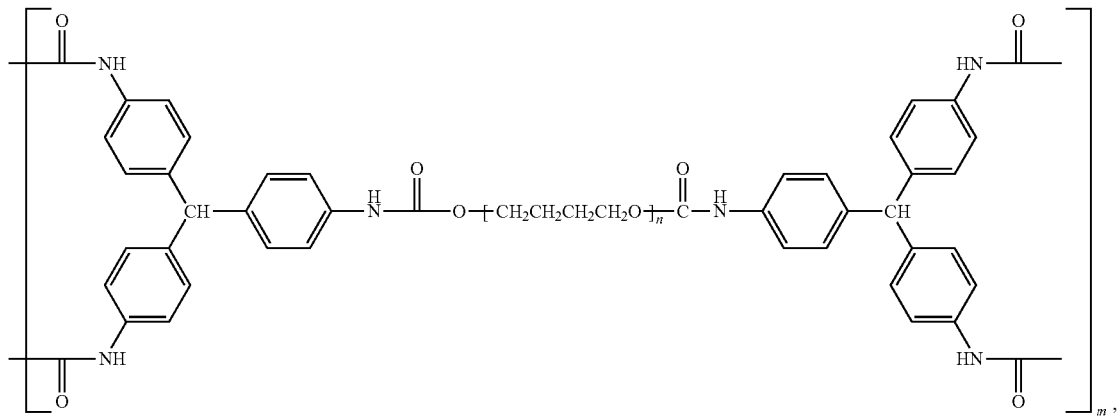

where n and m represent the number of repeat units in the polytetrahydrofuran chain and the crosslinked polytetrahydrofuran, respectively.

12. A method of sensing a strain, the method comprising:
exposing a composite to a strain, the composite comprising crosslinked polyether polyol and electrically conductive particles dispersed in the crosslinked polyether polyol, wherein the crosslinked polyether polyol is crosslinked by branched, urethane group-containing linkages or by branched, ether group-containing linkages; and
measuring a strain-induced decrease in the electrical conductance of the composite.

13. The method of claim 12, wherein the polyether polyol is polytetrahydrofuran.

14. The method of claim 13, wherein the polytetrahydrofuran is crosslinked by branched, urethane group-containing linkages.

15. The method of claim 14, wherein the urethane groups are part of an aryl group.

16. The method of claim 15, wherein the crosslinked polytetrahydrofuran has the structure:

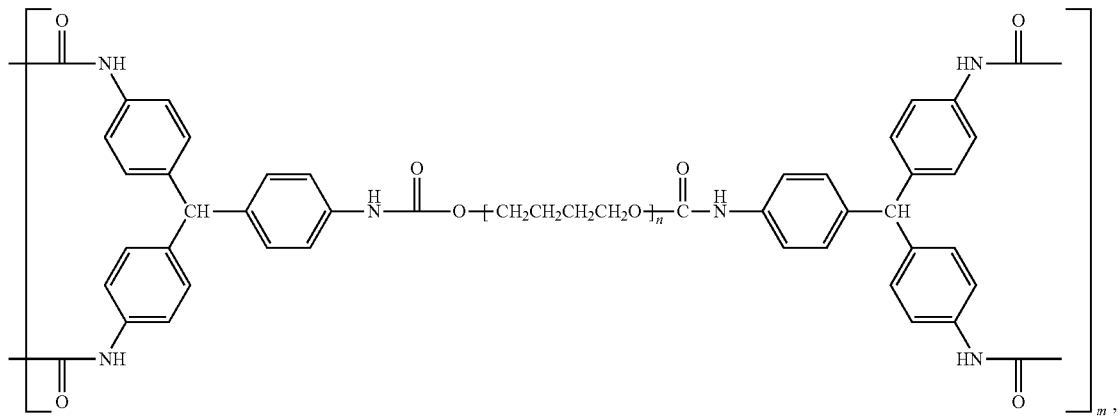

where n and m represent the number of repeat units in the polytetrahydrofuran chain and the crosslinked polytetrahydrofuran, respectively.

17. The method of claim 16, wherein the strain induces the formation of microcrystalline domains in the crosslinked polyether polyol.

18. The method of claim 12, wherein the electrically conductive particles are carbon particles.

19. The method of claim 18, wherein the carbon particles comprise carbon nanotubes.

20. The method of claim 12, wherein the strain decreases the electrical conductivity of the composite by a factor of at least 1000.

21. A method of sensing a strain, the method comprising:
exposing a composite to a strain, the composite comprising crosslinked polyether polyol and electrically conductive particles dispersed in the crosslinked polyether polyol, wherein the strain induces the formation of microcrystalline domains in the crosslinked polyether polyol.

22. A composite comprising: polytetrahydrofuran crosslinked with triphenymethane triisocyanate, the crosslinked polytetrahydrofuran having the structure:

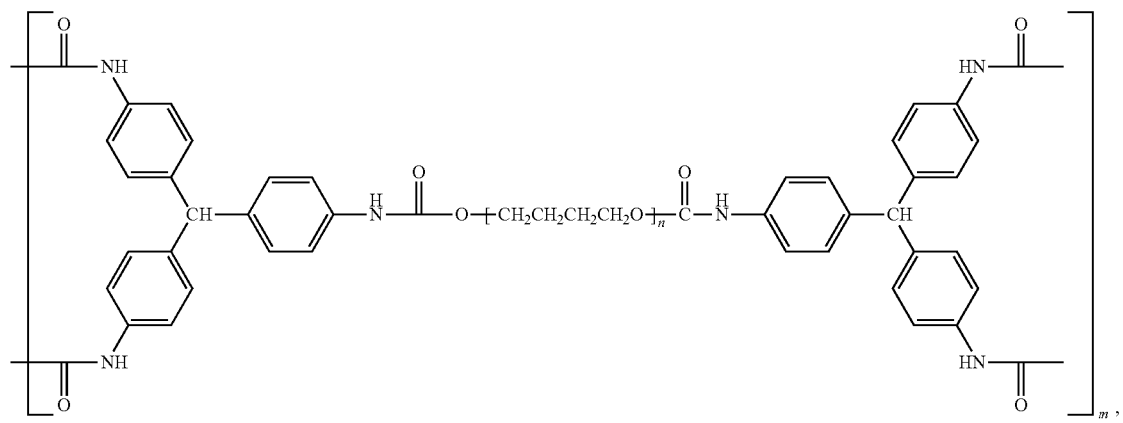

where n and m represent the number of repeat units in the polytetrahydrofuran chain and the crosslinked polytetrahydrofuran, respectively; and
electrically conductive particles dispersed in the crosslinked polytetrahydrofuran.

23. The composite of claim 22, wherein the electrically conductive particles are carbon particles.

* * * * *

UNITED STATES PATENT AND TRADEMARK OFFICE
CERTIFICATE OF CORRECTION

PATENT NO. : 10,378,876 B2
APPLICATION NO. : 15/171990
DATED : August 13, 2019
INVENTOR(S) : Shaoqin Gong et al.

It is certified that error appears in the above-identified patent and that said Letters Patent is hereby corrected as shown below:

In the Specification

Column 3, Lines 33-34:
Delete the phrase "width change (left, $v_{width}$) and thickness change (right, $v_{thickness}$)" and replace with --width change (left, $\upsilon_{width}$) and thickness change (right, $\upsilon_{thickness}$).--

Column 8, Line 65:
Delete the phrase "parameter $v_{thickness}$" and replace with --parameter $\upsilon_{thickness}$--.

Column 8, Line 67:
Delete the phrase "and $v_{width}$ is the Poisson's ratio" and replace with --and $\upsilon_{width}$ is the Poisson's ratio--.

Column 13, Line 21:
Delete the phrase "(diffraction angles, 20)" and replace with --(diffraction angles, 2θ)--.

Column 14, Lines 1-2:
Delete the phrase "The parameter $v_{thickness}$ is the Poisson's ratio of thickness and $v_{width}$ is the Poisson's ratio of width." and replace with --The parameter $\upsilon_{thickness}$ is the Poisson's ratio of thickness and $\upsilon_{width}$ is the Poisson's ratio of width.--.

Signed and Sealed this
Twenty-ninth Day of October, 2019

Andrei Iancu
*Director of the United States Patent and Trademark Office*